US008554890B2

(12) United States Patent
Tameshige et al.

(10) Patent No.: US 8,554,890 B2
(45) Date of Patent: Oct. 8, 2013

(54) METHOD OF DEPLOYING A PRODUCTION ENVIRONMENT USING A DEVELOPMENT ENVIRONMENT

(75) Inventors: Takashi Tameshige, Tokyo (JP); Yoshifumi Takamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 1197 days.

(21) Appl. No.: 11/527,495

(22) Filed: Sep. 27, 2006

(65) Prior Publication Data
US 2007/0276897 A1 Nov. 29, 2007

(30) Foreign Application Priority Data

May 23, 2006 (JP) ................................ 2006-142748

(51) Int. Cl.
*G06F 15/173* (2006.01)
(52) U.S. Cl.
USPC ................................ 709/223; 718/1; 715/734
(58) Field of Classification Search
USPC ................................ 709/223; 718/1; 715/734
See application file for complete search history.

(56) References Cited

U.S. PATENT DOCUMENTS

| 7,356,679 | B1 * | 4/2008 | Le et al. ............................. 713/1 |
| 7,484,208 | B1 * | 1/2009 | Nelson ............................. 718/1 |
| 7,577,722 | B1 * | 8/2009 | Khandekar et al. ........... 709/220 |
| 7,865,893 | B1 * | 1/2011 | Omelyanchuk et al. .......... 718/1 |
| 2004/0210591 | A1 * | 10/2004 | Hirschfeld et al. ........... 707/100 |
| 2005/0223210 | A1 | 10/2005 | Sasaki et al. |
| 2005/0289538 | A1 * | 12/2005 | Black-Ziegelbein et al. . 717/177 |
| 2006/0040667 | A9 * | 2/2006 | Coppinger et al. ........... 455/436 |
| 2006/0074618 | A1 * | 4/2006 | Miller et al. ..................... 703/13 |
| 2006/0089995 | A1 * | 4/2006 | Kerr et al. ....................... 709/227 |
| 2006/0090136 | A1 * | 4/2006 | Miller et al. ................... 715/734 |
| 2006/0107087 | A1 * | 5/2006 | Sieroka et al. ..................... 714/4 |
| 2007/0079307 | A1 * | 4/2007 | Dhawan et al. ................... 718/1 |
| 2007/0250833 | A1 * | 10/2007 | Araujo et al. ..................... 718/1 |

FOREIGN PATENT DOCUMENTS

| JP | 2002-278769 | 9/2002 |
| JP | 2004-103263 | 4/2004 |
| JP | 2005-292922 | 10/2005 |

OTHER PUBLICATIONS

Shin Nozu, "Practice! Installation and Operation of VMware Server", *Software Design*, Gijyutsu Hyouronsha Co., Ltd., May 18, 2006, vol. 188, pp. 79-87.

* cited by examiner

*Primary Examiner* — Krista Zele
*Assistant Examiner* — James Forman
(74) *Attorney, Agent, or Firm* — Antonelli, Terry, Stout & Kraus, LLP.

(57) ABSTRACT

Provided is a computer system, including: at least one storage system providing at least one logical volume, at least one host computer including an I/O device, and a management computer, in which the management computer creates a virtual computer within a network segment to which the management computer belongs, the virtual computer including an I/O device that is the same as the I/O device of the host computer in number and type, defines a connection between the logical volume and the virtual computer, stores a program in the logical volume connected to the virtual computer, sets identification information on the host computer in the virtual computer, releases the connection between the logical volume that stores the program and the virtual computer, and defines a connection between the logical volume whose connection has been released and the host computer.

10 Claims, 19 Drawing Sheets

| | 900 901 | 902 | 903 | 904 | 905 | 906 |
|---|---|---|---|---|---|---|
| SERVER ID | HBA | | | NIC | | |
| | NUMBER | WWN | DRIVER TYPE | NUMBER | MAC ADDRESS | DRIVER TYPE |
| SERVER 1 | 1 | WWN1 | H-Driver1 | 1 | MAC1 | N-Driver1 |
| SERVER 2 | 2 | WWN2 | H-Driver2 | 2 | MAC2 | N-Driver2 |
| | | WWN3 | H-Driver2 | | MAC3 | N-Driver3 |
| ⋮ | ⋮ | ⋮ | ⋮ | ⋮ | ⋮ | ⋮ |

216
SERVER CONFIGURATION MANAGEMENT TABLE

217

| SERVER ID | SERVER INFORMATION | | NETWORK INFORMATION | | | STORAGE INFORMATION | | | VIRTUAL SERVER INFORMATION | | | | | |
|---|---|---|---|---|---|---|---|---|---|---|---|---|---|---|
| | HOST NAME | PASSWORD | IP ADDRESS | SUBNET MASK | DEFAULT GATEWAY | DISK IMAGE NAME | HOST GROUP NAME | LU ID | VIRTUAL HBA | | VIRTUAL NIC | | VIRTUAL CPU | VIRTUAL MEMORY |
| | | | | | | | | | VIRTUAL WWN | SHARED/ OCCUPYING | VIRTUAL MAC | SHARED/ OCCUPYING | | |
| SERVER 1 | HOST 1 | PASSWORD 1 | IP1 | S/M1 | DGW1 | IMAGE 1 | HGROUP 1 | LU11 | vWWN1 | SHARED | vMAC1 | OCCUPYING | 20% | 20% |
| SERVER 2 | HOST 2 | PASSWORD 2 | IP2 | S/M2 | DGW2 | IMAGE 2, IMAGE 3 | HGROUP 2, HGROUP 3 | LU21 | SERVER CONFIGU- RATION MANAGEMENT TABLE | OCCUPYING | AUTOMATI- CALLY GENERATED | OCCUPYING | AUTOMATI- CALLY ALLOCATED | AUTOMATI- CALLY ALLOCATED |
| | | | IP3 | S/M3 | DGW3 | | | | | | | | | |
| ... | ... | | ... | ... | ... | ... | ... | ... | ... | | ... | | ... | ... |
| 1000 | 1001 | 1002 | 1003 | 1004 | 1005 | 1006 | 1007 | 1008 | 1009 | 1010 | 1011 | 1012 | 1013 | 1014 |

IDENTIFICATION INFORMATION MANAGEMENT TABLE

| VIRTUAL SERVER ID | VIRTUAL HBA | | | VIRTUAL NIC | | | VIRTUAL CPU | VIRTUAL MEMORY | DEPLOYMENT TARGET SERVER |
|---|---|---|---|---|---|---|---|---|---|
| | PHYSICAL WWN | VIRTUAL WWN | SHARED/ OCCUPYING | PHYSICAL MAC | VIRTUAL MAC | SHARED/ OCCUPYING | | | |
| 1100 | 1101 | 1102 | 1103 | 1104 | 1105 | 1106 | 1107 | 1108 | 1109 |
| VIRTUAL SERVER 1 | WWN5 | vWWN1 | OCCUPYING | MAC5 | vMAC1 | SHARED | 20% | 20% | SERVER 1 |
| VIRTUAL SERVER 2 | WWN6 | vWWN2 | SHARED | MAC6 | vMAC2 | SHARED | 40% | 20% | SERVER 2 |
| ... | ... | vWWN3 | SHARED | ... | vMAC3 | SHARED | ... | ... | ... |

218

DEPLOYMENT EXECUTION SERVER MANAGEMENT TABLE

| DISK IMAGE NAME | ORIGINAL DISK IMAGE LU ID | OS | | Middleware | | Application | | DRIVER STORAGE PATH |
|---|---|---|---|---|---|---|---|---|
| | | NAME | PATCH | NAME | PATCH | NAME | PATCH | |
| IMAGE 1 | LUxx1 | OS1 | Po1-1 | MW1 | Pm1-1 | --- | --- | SYSTEM DIRECTORY |
| IMAGE 2 | LUxx2 | OS2 | Po2-1, Po2-2 | MW2 | --- | App1 | Pa1-1 | /usr/dev/ |
| ... | ... | ... | ... | ... | ... | ... | ... | ... |

1200, 1201, 1202, 1203, 1204, 1205, 1206, 1207, 1208

219 DISK IMAGE MANAGEMENT TABLE

*FIG. 11*

| HOST GROUP NAME | WWN | LUID |
|---|---|---|
| HOST GROUP 1 | WWN 1 | LU11 |
| HOST GROUP 2 | WWN 2 | LU12 |
|  | WWN 3 |  |
| ⋮ | ⋮ | ⋮ |

1300 — HOST GROUP NAME
1301 — WWN
1302 — LUID
220 — SECURITY MANAGEMENT TABLE

FIG. 12

METHOD OF DEPLOYING A PRODUCTION ENVIRONMENT USING A DEVELOPMENT ENVIRONMENT

CLAIM OF PRIORITY

The present application claims priority from Japanese patent application P2006-142748 filed on May 23, 2006, the content of which is hereby incorporated by reference into this application.

BACKGROUND OF THE INVENTION

This invention relates to a computer system including a storage system, a host computer, and a management computer, and more particularly, to a technique of deploying a program.

Up to now, there is known a technique in which a deployment management server deploys an OS. The deployment management server deploys an OS on a server using a DHCP function and a network boot function.

JP 2005-292922 A discloses a technique of deploying an OS via a storage network.

SUMMARY OF THE INVENTION

In conventional techniques, a deployment target server sets identification information. Accordingly, a single deployment management server can execute deployment only on a server belonging to a single network segment. This leads to a problem in that the conventional techniques require the deployment management server to be installed in every network segment.

The management of a computer system including a plurality of deployment management servers is troublesome, which imposes a great burden on an administrator.

This invention has been made in view of the above-mentioned problems, and therefore it is an object of this invention to provide a deployment management server for executing deployment on a plurality of servers belonging to different network segments.

According to an exemplary embodiment of this invention, there is provided a computer system, comprising: at least one storage system including a physical disk for storing data and a disk controller for controlling the physical disk; at least one host computer including a processor, a memory, and an I/O device; and a management computer including a processor, a memory, and an I/O device, which can access the storage system and the host computer, the storage system providing a storage area of the physical disk as at least one logical volume, wherein: the management computer creates a virtual computer within a network segment to which the management computer belongs, the virtual computer including an I/O device that is the same as the I/O device of the host computer in number and type; the management computer defines a connection between the virtual computer and the logical volume; the management computer stores a program in the logical volume connected to the virtual computer; the management computer sets identification information on the host computer in the virtual computer; the management computer releases the connection between the logical volume that stores the program and the virtual computer; and the management computer defines a connection between the logical volume whose connection with the virtual computer has been released and the host computer, whereby the program stored in the logical volume is deployed on the host computer.

According to the representative embodiment of this invention, a single deployment management server can execute deployment on a plurality of servers belonging to different network segments.

BRIEF DESCRIPTION OF THE DRAWINGS

The present invention can be appreciated by the description which follows in conjunction with the following figures, wherein:

FIG. 9 is a configuration diagram of the identification information management table stored in the deployment management server according to the first embodiment of this invention;

FIG. 10 is a configuration diagram of the deployment execution server management table stored in the deployment management server according to the first embodiment of this invention;

FIG. 11 is a configuration diagram of the disk image management table stored in the deployment management server according to the first embodiment of this invention;

FIG. 12 is a configuration diagram of the security management table stored in the deployment management server according to the first embodiment of this invention;

DETAILED DESCRIPTION OF THE PREFERRED EMBODIMENTS

Hereinafter, explanation is made of embodiments of this invention, with reference to the drawings.

First Embodiment

Figure 1:
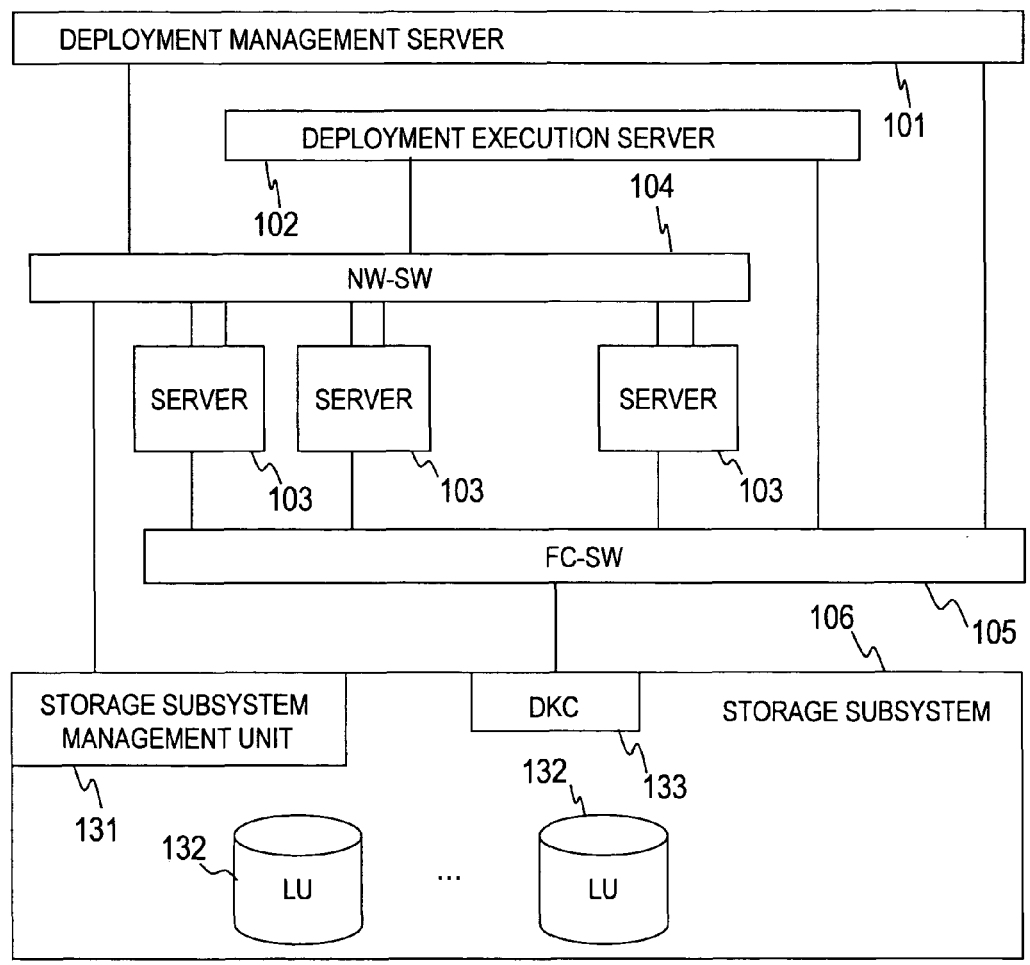
FIG. 1 is a block diagram of a configuration of a computer system according to a first embodiment of this invention.

FIG. 1 is a block diagram of a configuration of a computer system according to a first embodiment of this invention.

The computer system includes a deployment management server 101, a deployment execution server 102, a server 103, a storage subsystem 106, a network switch (NW-SW) 104, and a fibre channel switch (FC-SW) 105.

The deployment management server 101, the deployment execution server 102, the sever 103, and the storage subsystem 106 are mutually connected via the network switch 104.

Further, the deployment management server 101, the deployment execution server 102, and the server 103, are connected to the storage subsystem 106 via a storage area network (SAN). In this embodiment, explanation is given regarding a case in which the SAN is an FC-SAN. In this situation, the SAN is configured with one or more fibre channel switches 105.

It should be noted that the SAN may be an IP-SAN instead of an FC-SAN. In this case, the computer system is provided with a network switch instead of the fibre channel switch 105. Further, an iSCSI name may be used instead of a world wide name (WWN) in deployment processing.

The deployment management server 101 is a computer for managing deployment on the server 103. It should be noted that the deployment management server 101 is explained later in detail referring to FIG. 2.

The deployment execution server 102 is a computer that provides a virtual server. It should be noted that the virtual server dedicates or shares the physical resources of the deployment execution server 102. Further, the virtual server is furnished with a identification information for deployment, instead of using that of the server 103. The identification information includes an identifier and IP address of the server 103. It should be noted that the deployment execution server 102 and the virtual server are explained later in detail referring to FIG. 3.

The server 103 is a computer which is the deployment target. It should be noted that the server 103 is explained later in detail referring to FIG. 4.

The storage subsystem 106 is provided with a storage subsystem management unit 131, a disk controller (DKC) 133 and a physical disk. It should be noted that the storage subsystem 106 is explained later in detail referring to FIG. 5.

The physical disk stores various types of data. For example, the physical disk stores data that is requested to be inputted into the server 103.

The disk controller 133 is connected to the deployment management server 101, the deployment execution server 102, and the server 103 via the fibre channel switch 105. The disk controller 133 controls the writing of data to the physical disk, and the reading of data from the physical disk. The disk controller 133 provides a storage area of physical disk to the server 103 etc. as one or more logical volumes (LU) 132.

The storage subsystem management unit 131 is connected to the deployment management server 101 etc. via the network switch 104. The storage subsystem management unit 131 receives an instruction from the deployment management server 101, and performs processing according to the received instruction.

Figure 2:
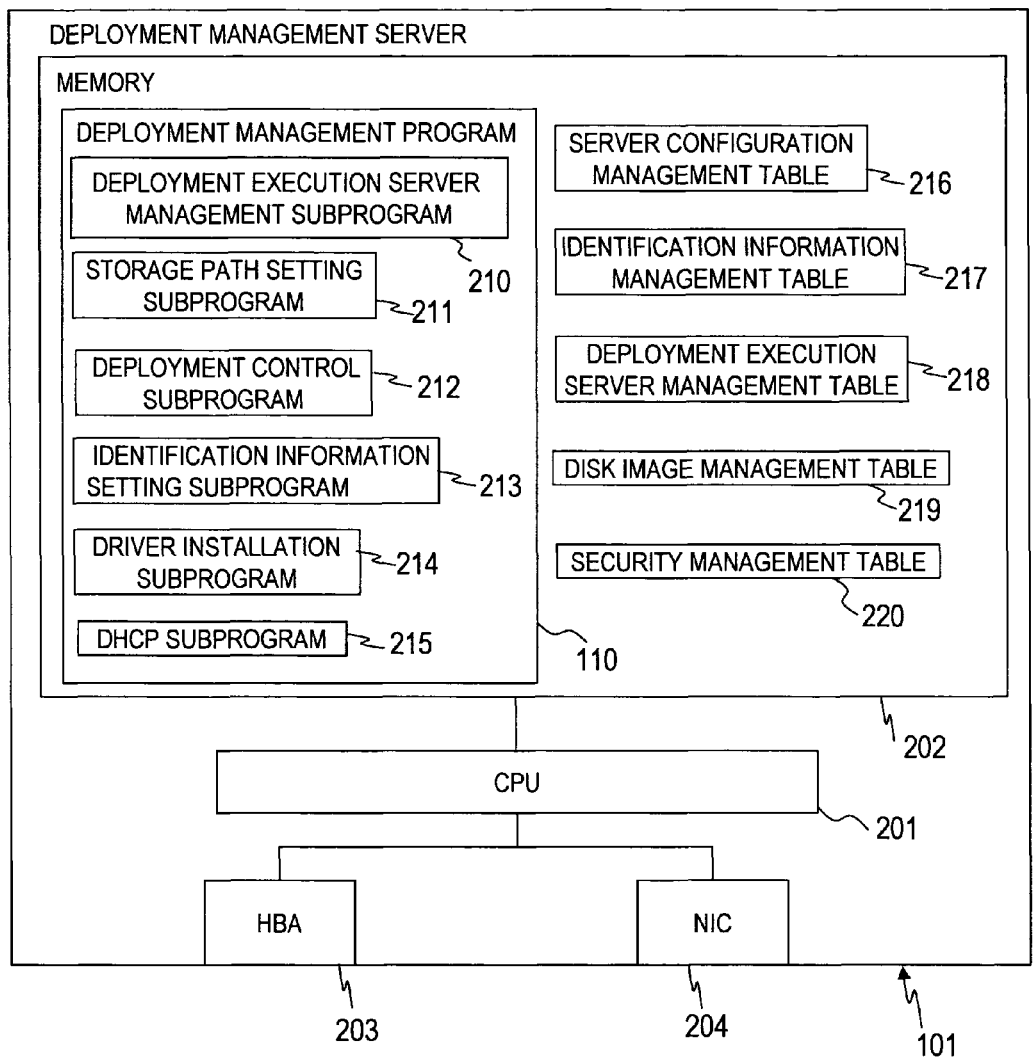
FIG. 2 is a block diagram of a configuration of the deployment management server according to the first embodiment of this invention.

FIG. 2 is a block diagram of a configuration of the deployment management server 101 according to the first embodiment of this invention.

The deployment management server 101 is provided with a central processing unit (CPU) 201, a memory 202, a host bus adaptor (HBA) 203, and a network interface card (NIC) 204.

The HBA 203 is an interface connecting to the storage subsystem 106 via the fibre channel switch 105. The NIC 204 is an interface connecting to the deployment execution server 102, the server 103, and the storage subsystem 106, via the network switch 104.

The CPU 201 performs various types of processing, by executing programs stored in the memory 202.

The memory 202 stores programs executed by the CPU 201 and information etc. which the CPU 201 requires. To be specific, the memory 202 stores a deployment management program 110, a server configuration management table 216, a identification information management table 217, a deployment execution server management table 218, a disk image management table 219, and a security management table 220.

The deployment management program 110 manages deployment on the server 103. The deployment management program 110 also includes a deployment execution server management subprogram 210, a storage path setting subprogram 211, a deployment control subprogram 212, a identification information setting subprogram 213, a driver installation subprogram 214, and a dynamic host configuration protocol (DHCP) subprogram 215. It should be noted that the processing performed by the deployment management program 110 is explained later in detail referring to FIG. 14.

The deployment execution server management subprogram 210 manages the processing of the deployment execution server 102. For example, the deployment execution server management subprogram 210 requests the deployment execution server 102 to generate the virtual server.

The storage path setting subprogram 211 controls the path connecting the LU 132 provided by the storage subsystem 106 and the server 103. The storage path setting subprogram 211 also controls the path for connecting the LU 132 provided by the storage subsystem 106, and the virtual server generated by the deployment execution server 102.

The deployment control subprogram 212 deploys a disk image on the virtual server. The identification information setting subprogram 213 references the identification information management table 217 and sets the identification information for the virtual server.

The driver installation subprogram 214 stores the device driver needed by the server 103 into the system disk LU. The DHCP subprogram 215 dynamically assigns IP addresses.

The server configuration management table 216 manages information relating to the hardware configuration of the server 103. It should be noted that the server configuration management table 216 is explained later in detail referring to FIG. 8.

The identification information management table 217 manages the identification information that is set on the server 103. It should be noted that the identification information management table 217 is explained later in detail referring to FIG. 9.

The deployment execution server management table 218 manages the information relating to the virtual server generated by the deployment execution server 102. It should be noted that the deployment execution server management table 218 is explained later in detail referring to FIG. 10.

The disk image management table 219 manages the content of the disk image deployed on the server 103 or the virtual server. It should be noted that the disk image management table 219 is explained later in detail referring to FIG. 11.

The security management table 220 manages the LU 132 accessible by the server 103. The security management table 220 also manages the LU 132 accessible by the virtual server generated by the deployment execution server 102. It should be noted that the security management table 220 is explained later in detail referring to FIG. 12.

Figure 3:
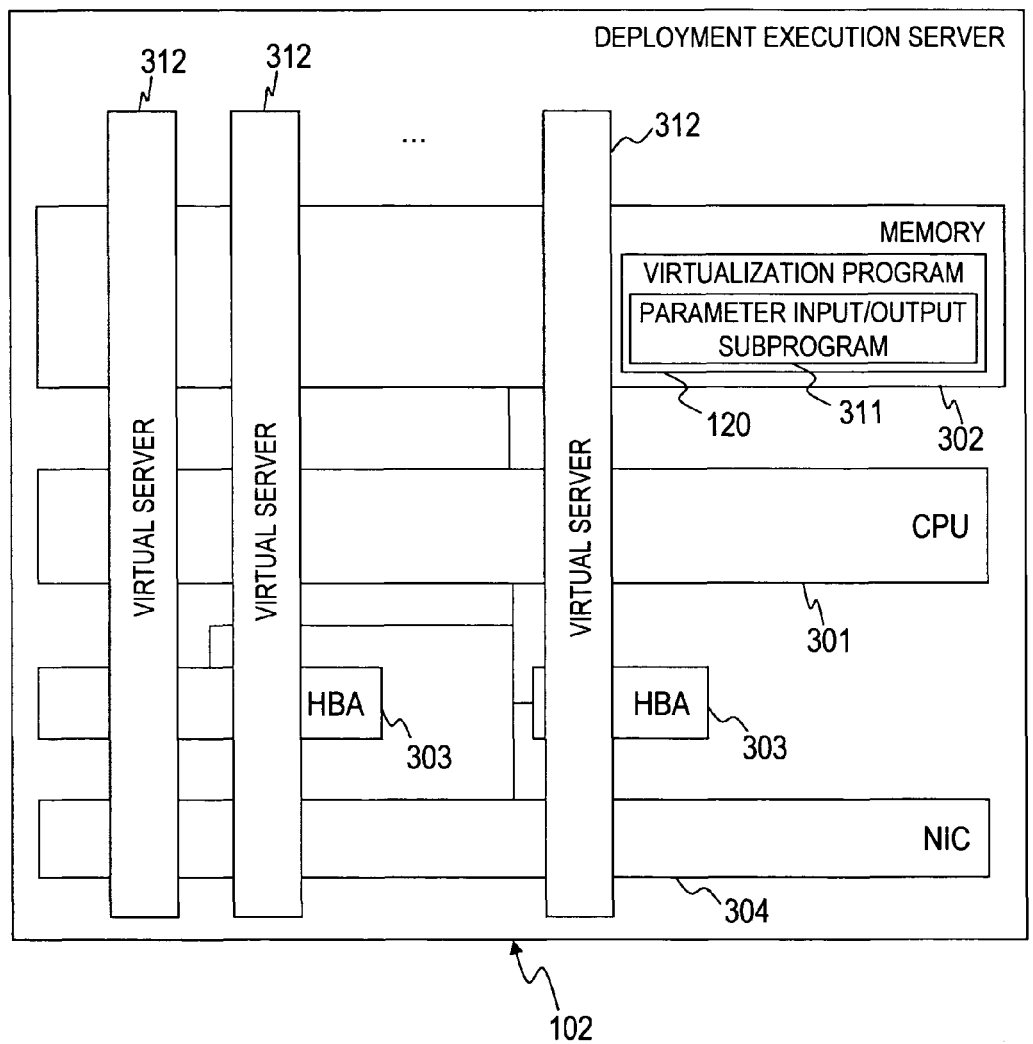
FIG. 3 is a block diagram of a configuration of the deployment execution server according to the first embodiment.

FIG. 3 is a block diagram of a configuration of the deployment execution server 102 according to the first embodiment.

The deployment execution server 102 includes a CPU 301, a memory 302, an HBA 303, and an NIC 304.

The HBA 303 is an interface connecting to the storage subsystem 106 via the fibre channel switch 105. The NIC 304 is an interface connecting to the deployment management server 101 via the network switch 104.

The CPU 301 performs various types of processing, by executing programs stored in the memory 302.

The memory 302 stores programs executed by the CPU 301, information needed by the CPU 301, etc. To be specific, the memory 302 stores a virtualization program 120.

The virtualization program 120 generates a virtual server 312. The virtual sever 312 shares or dedicates the physical resources of the deployment execution server 102. The physical resources of the deployment execution server 102 include the CPU 301, the memory 302, the HBA 303, and the NIC 304.

Further, the virtualization program 120 includes a parameter input/output subprogram 311. The parameter input/output subprogram 311 receives a virtual server generation request from the deployment management server 101 etc. Subsequently, the virtualization program 120 generates the virtual server 312 based on the virtual server generation request.

Further, the parameter input/output subprogram 311 receives a request to delete the virtual server 312 or a request to modify the configuration of the virtual server 312 from the deployment management server 101 etc. Subsequently, the virtualization program 120 performs the deletion of the virtual server 312 or the modification of the configuration of the virtual server 312 based on the request received by the virtual server 312.

In this embodiment, the virtualization program 120 generates the virtual server 312 having the same kind of I/O devices and the same quantity of I/O devices as are provided to the server 103 which is the deployment target. It should be noted that the I/O devices include the NIC and the HBA.

At this time, the hardware configuration recognized by an operating system (OS) on the virtual server 312 and the hardware configuration recognized by the OS on the server 103 are the same. Therefore, the generated virtual server 312 is used as the server on which to set the identification information.

The virtual server 312 includes a virtual CPU, a virtual memory, a virtual HBA, a virtual NIC, and a virtual baseboard management controller (BMC).

The virtual CPU is achieved by a part or the entirety of the CPU 301 provided to the deployment execution server 102. The virtual CPU performs the various types of processing by executing programs stored in the virtual memory.

The virtual memory is achieved by a part or the entirety of the memory 302 provided to the deployment execution server 102. The virtual memory stores programs executed) by the virtual CPU, the information needed by the virtual CPU, etc.

The virtual HBA is achieved by a part or the entirety of the HBA 303 provided to the deployment execution server 102. The virtual HBA is an interface connecting to the storage subsystem 106 via the fibre channel switch 105. It should be noted that the WWN of the HBA 403 provided to the server 103 is set on the virtual HBA.

The virtual NIC is achieved by a part or the entirety of the NIC 304 provided to the deployment execution server 102. The virtual NIC is an interface connecting to the deployment management server 101 via the network switch 104. It should be noted that the virtual NIC is set with a media access control (MAC) address for a NIC 404 provided to the server 103.

The virtual BMC is connected to the deployment management server 101. The virtual BMC activates or deactivates the virtual server 312, according to an instruction from the deployment management server 101.

Further, the virtualization program 120 may be operated from a virtual management console. The virtual management console is identical to those generally provided to a virtualization program. The virtual management console is generated in a region that will be necessarily generated and not deleted. That is, the virtual management console is generated in a special region other than the region where the virtual server 312 is generated.

Figure 4:
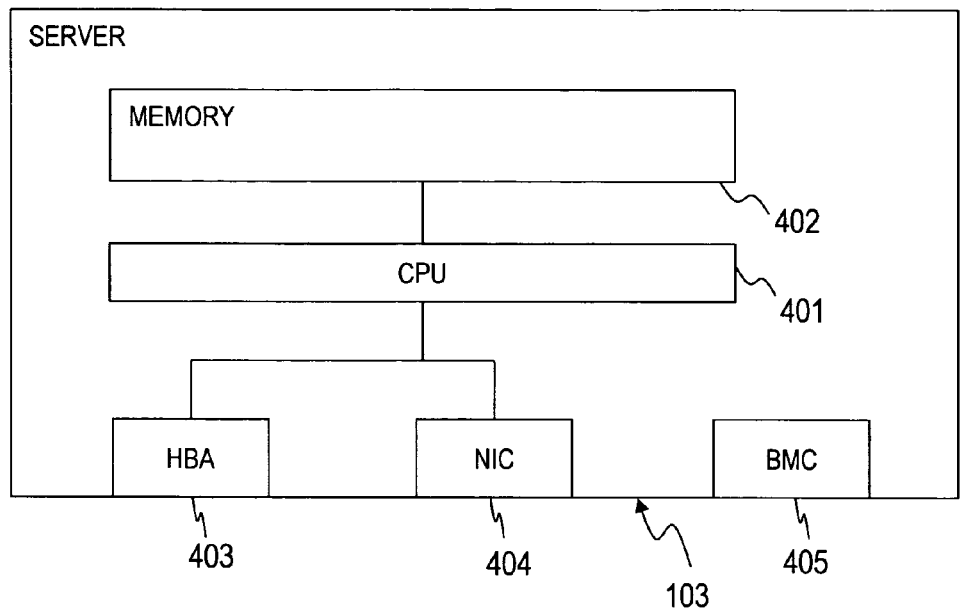
FIG. 4 is a block diagram of a configuration of the server according to the first embodiment of this invention.

FIG. 4 is a block diagram of a configuration of the server 103 according to the first embodiment of this invention.

The server 103 includes a CPU 401, a memory 402, an HBA 403, the NIC 404, and a baseboard management controller (BMC) 405.

The HBA 403 is an interface connecting to the storage subsystem 106 via the fibre channel switch 105. The NIC 404 is an interface connecting to the deployment management server 101 via the network switch 104.

The BMC 405 is connected to the deployment management server 101. The BMC 405 controls the power source of the server 103 in accordance with an instruction from the deployment management server 101.

The CPU 401 performs various types of processing by executing programs stored in the memory 402. The memory 402 stores programs executed by the CPU 401, information needed by the CPU 401, etc.

It should be noted that the server 103 may be a virtual server which is provided by a virtualization program.

Figure 5:
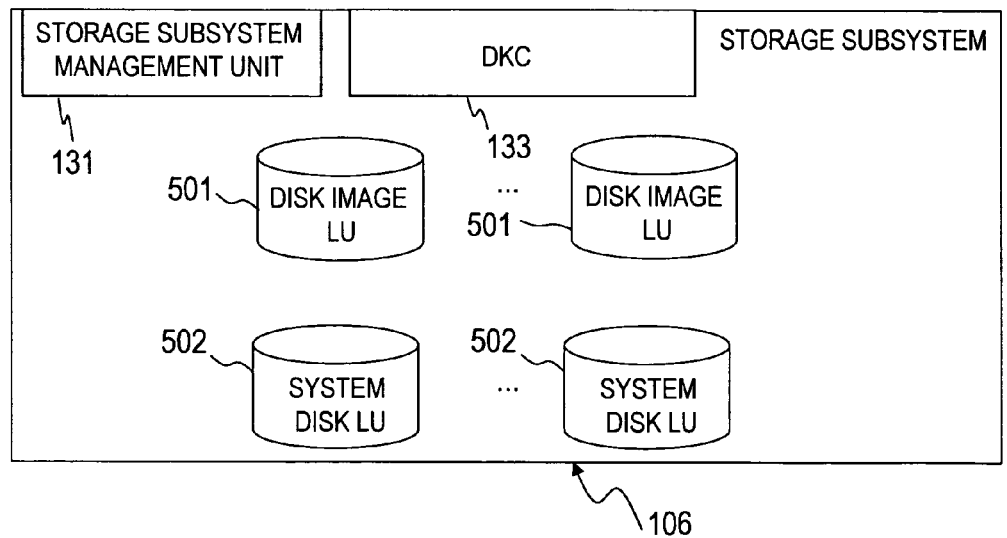
FIG. 5 is a block diagram of a configuration of the storage subsystem according to the first embodiment of this invention.

FIG. 5 is a block diagram of a configuration of the storage subsystem 106 according to the first embodiment of this invention.

The storage subsystem 106 includes the storage subsystem management unit 131, the disk controller (DKC) 133, and the physical disk.

The disk controller 133 provides the storage areas of physical disk as one or more LUs 132 to the server 103 etc. It should be noted that the LUs 132 includes a disk image LU 501 and a system disk LU 502.

The disk image LU 501 stores disk image deployed on the server 103. The system disk LU 502 stores a system which is booted up by the server 103. It should be noted that the system disk LU 502 is the LU 132 storing the identification information and the duplicate data of the disk image LU 501.

The storage subsystem management unit 131 receives an instruction from the deployment management server 101, and performs processing according to the received instruction.

The deployment management server 101 controls the LUs 132, which include the disk image LU 501 and the system disk LU 502, via the storage subsystem management unit 131.

Figure 6:
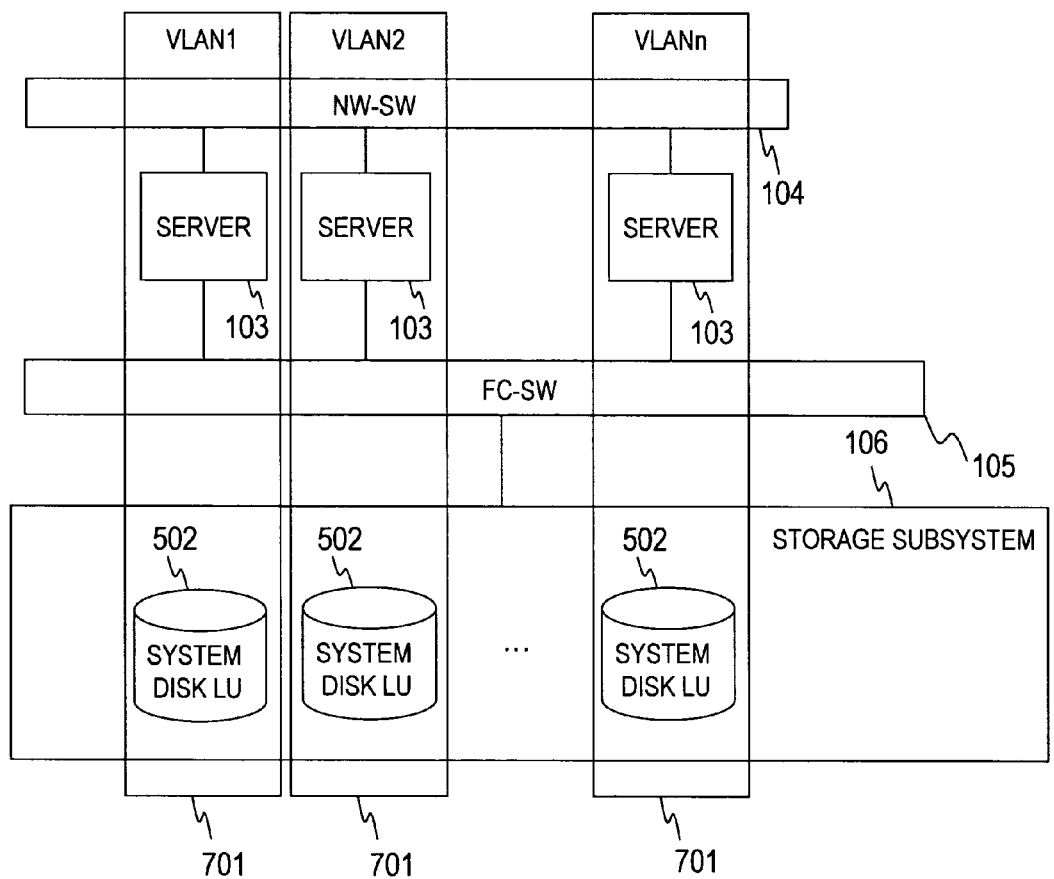
FIG. 6 is an explanatory diagram of a network segment in accordance with the first embodiment of this invention.

FIG. 6 is an explanatory diagram of a network segment in accordance with the first embodiment of this invention.

The computer system of this invention includes a plurality of network segments 701. For example, by configuring a virtual LAN (VLAN), the computer system of this embodiment is divided into a plurality of network segments 701. The network segment 701 is defined as the range within which broadcast packets can be delivered.

In a computer system applying the conventional deployment method, it is necessary for each network segment 701 to have the deployment management server 101. Because of this, the management of the plurality of deployment management servers 101 is difficult.

On the other hand, it is necessary for the computer system of this embodiment to merely have a single deployment management server 101. In other words, the deployment management server 101 of this embodiment can manage deployment to multiple servers 103 on different network segments 701.

Figures 7, 8:
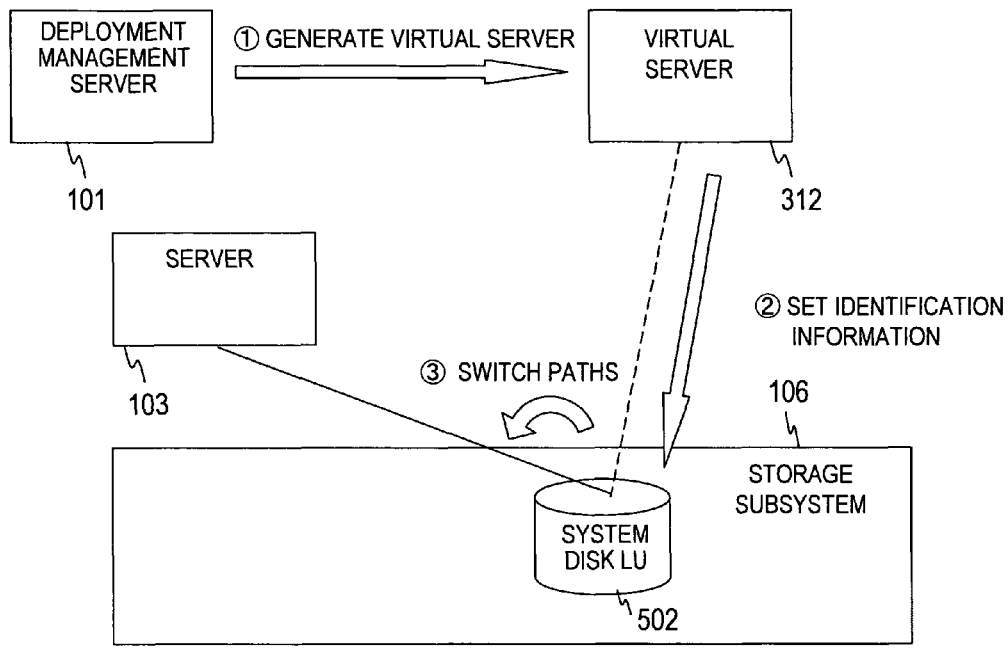
FIG. 7 is an explanatory diagram outlining a deployment method of the first embodiment of this invention.
FIG. 8 is a configuration diagram of the server configuration management table which is stored in the deployment management server according to the first embodiment of this invention.

FIG. 7 is an explanatory diagram outlining a deployment method of the first embodiment of this invention.

First, a request to deploy on the server 103 is inputted into the deployment management server 101. Subsequently, the deployment management server 101 requests the deployment execution server 102 to generate the virtual server 312. Then, the deployment execution server 102 generates the virtual server 312 having the identical I/O device configuration as the server 103. It should be noted that the deployment management server 101 and the deployment execution server 102 belong to the same network segment. Therefore, the virtual server 312 is generated within the network segment to which the deployment management server 101 belongs.

Next, the deployment management server 101 deploys the disk image on the generated virtual server 312. To be specific, the deployment management server 101 duplicates the disk image LU 501. Next, the deployment management server 101 sets a path between the duplicated LU 132 and the virtual server 312.

Next, the deployment management server 101 sets the identification information of the server 103 on the virtual server 312. Then, the virtual server 312 creates the system disk LU 502 by storing the identification information, which is set, into the duplicated LU 132. It should be noted that the identification information includes a host name, an IP address, a subnet mask, a default gateway, etc.

Further, the identification information may also include a MAC address. This enables the virtual server 312 to set a MAC address of the NIC 404 provided to the server 103, for the virtual NIC provided to the virtual server 312. In this case, "teaming" can be set up for the virtual NIC provided to the virtual server 312. Teaming is a technique for making a plurality of NICs be recognized as a single one. Further, the MAC addresses are internally assigned by the OS. Accordingly, it is necessary for the virtual server 312 to make the OS recognize the MAC address assigned to the server 103.

Next, the deployment management server 101 shuts down (i.e., deactivates) the virtual server 312. Then, the deployment management server 101 switches the path that is connected to the system disk LU 502, from the virtual server 312 to the server 103. To be specific, the deployment management server 101 releases the path between the system disk LU 502 and the virtual server 312. Then, the deployment management server 101 sets a path between the system disk LU 502 and the server 103.

Accordingly, the deployment management server 101 can deploy the disk image on to the virtual server 312 and set the identification information to the virtual server 312, thus achieving deployment on the server 103.

FIG. 8 is a configuration diagram of the server configuration management table 216 which is stored in the deployment management server 101 according to the first embodiment of this invention.

The server configuration management table 216 manages the I/O device configuration of the server 103. To be specific, the server configuration management table 216 contains a server ID 900, an HBA quantity 901, an HBA WWN 902, an HBA driver type 903, and NIC quantity 904, an NIC MAC address 905, and an NIC driver type 906.

The server ID 900 is a unique identifier of the server 103.

The HBA quantity 901 is the quantity of HBAs 403 provided to the server identified by the server ID 900 in the pertinent record. The HBA WWN 902 is a WWN assigned to the HBA 403 provided to the server 103 identified by the server ID 900 in the pertinent record.

The HBA driver type 903 is the driver type for the HBA 403 provided to the server 103 identified by the server ID 900 in the pertinent record. In other words, the HBA driver type 903 is the type of driver stored in the system disk LU 502 by the driver installation subprogram 214.

The NIC quantity 904 is the quantity of NICs 404 provided to the server 103 identified by the server ID 900 in the pertinent record. The NIC MAC address 905 is the MAC address assigned to the NIC 404 provided to the server 103 identified by the server ID 900 in the pertinent record.

The NIC driver type 906 is the driver type for the NIC 404 provided to the server 103 identified by the server ID 900 in the pertinent record. In other words, the NIC driver type 906 is the type of driver stored in the system disk LU 502 by the driver installation subprogram 214.

The deployment management server 101 sends to the server 103 an information-obtaining agent and an OS that is necessary for the information-obtaining agent. Then, the information-obtaining agent obtains information about the I/O device configuration of the server 103, and sends the obtained information to the deployment management server 101. Then, the deployment management server 101 creates or modifies the server configuration management table 216 based on the information received from the information-obtaining agent.

It should be noted that the deployment management server 101 may create or modify the server configuration management table 216 based on information inputted by a manager.

FIG. 9 is a configuration diagram of the identification information management table 217 stored in the deployment management server 101 according to the first embodiment of this invention.

The identification information management table 217 contains a server ID 1000, server information, network information, storage information, and virtual server information.

The server ID 1000 is a unique identifier of the server 103.

The server information includes a host name 1001 and a password 1002. The host name 1001 is a name for the manager to identify the server 103, which is identified by the server ID 1000 in the pertinent record. The password 1002 is a password which is set on the server 103 identified by the server ID 1000 in the pertinent record.

The network information includes an IP address 1003, a subnet mask (S/M) 1004 and a default gateway (DGW) 1005.

The IP address 1003 is an IP address that is assigned to the server 103 identified by the server ID 1000 in the pertinent record. The subnet mask 1004 is a value used to obtain the subnet of the server 103 identified by the server ID 1000 in the pertinent record.

The default gateway 1005 is the IP address of the default gateway that is set on the server 103 identified by the server ID 1000 in the pertinent record.

The storage information includes a disk image name 1006, a host group name 1007, and an LU ID 1008.

The disk image name 1006 is a name for the disk image that is requested to be deployed on the server 103 identified by the server ID 1000 in the pertinent record. The host group name 1007 is a unique identifier of the host group to which belongs the server 103 identified by the server ID 1000 in the pertinent record. It should be noted that the host group is explained later in detail referring to FIG. 14.

The LU ID 1008 is a unique identifier of the LU 132 accessible by the server belonging to the host group identified by the host group name 1007 in the pertinent record.

The virtual server information includes information about the virtual HBA, information about the virtual NIC, information about the virtual CPU, and information about the virtual memory.

The information about the virtual HBA includes the virtual HBA's virtual WWN 1009, and shared/dedicated 1010. It should be noted that the virtual HBA is provided to the virtual server 312 that is created in order to be deployed on the server 103 that is identified by the server ID 1000 in the pertinent record.

The virtual HBA's virtual WWN 1009 is a WWN which is assigned to the virtual HBA.

Further, instead of storing the WWN, the virtual HBA's virtual WWN 1009 can store "automatically generated" or "server configuration management table". In the case where the virtual HBA's virtual WWN 1009 stores "automatically generated", the deployment management server 101 automatically generates the WWN that is assigned to the virtual HBA.

Further, in the case where "server configuration management table" is stored as the virtual WWN 1009 of the virtual HBA, the deployment management server 101 references the server configuration management table 216 to set the WWN assigned to the virtual HBA. To be specific, the deployment management server 101 selects, from the server configuration management table 216, a record in which the server ID 1000 in that record matches the server ID 900 in the server configuration management table 216. Next, the deployment management server 101 extracts the HBA's WWN 902 from the selected record. Then, the deployment management server 101 sets the extracted HBA WWN 902 as the WWN to be assigned to the virtual HBA.

The shared/dedicated 1010 indicates whether the pertinent virtual HBA shares or dedicates the HBA 303 provided to the deployment execution server 102.

Information about the virtual NIC includes the virtual NIC MAC address 1101 and shared/dedicated 1012. It should be noted that the virtual NIC is provided to the virtual server 312 created to be deployed on the server 103 that is identified by the server ID 1000 in pertinent record.

The virtual NIC's virtual MAC address 1011 is the MAC address assigned to the virtual NIC.

Further, "automatically generated" or "server configuration management table" may be stored as the virtual MAC address 1011 for the virtual NIC, instead of storing the MAC address there. In the case where "automatically generated" is stored as the virtual NIC's virtual MAC address 1011, the deployment management server 101 automatically generates the MAC to be assigned to the virtual NIC.

Further, in the case where "server configuration management table" is stored as the virtual MAC address 1011 for the virtual NIC, the deployment management server 101 references the server configuration management table 216 to set the MAC address to be assigned to the virtual NIC. To be specific, the deployment management server 101 selects, from the server configuration management table 216, a record in which the server ID 1000 in that record matches the server ID 900 in the server configuration management table 216. Then, the deployment management server 101 extracts the NIC MAC address 905. Then the deployment management server 101 sets the extracted NIC MAC address 905 as the MAC address to be assigned to the virtual NIC.

Accordingly, the MAC address of the server 103 and the MAC address of the virtual server 312 are the same. In such case, teaming can be set for the virtual NICs of the virtual server 312.

The shared/dedicated 1012 indicates whether the pertinent virtual NIC dedicates or shares the NIC 303 provided to the deployment execution server 102.

Information about the virtual CPU includes a usage rate 1013 of the virtual CPU. It should be noted that the virtual CPU is provided to the virtual server 312 created for the deployment of the server 103 identified by the server ID 1000 in the pertinent record.

The virtual CPU usage rate 1013 is the ratio of the resources used by the virtual CPU to the resources of the CPU 301 provided to the deployment execution server 102. It should be noted that instead of storing a usage rate, the virtual CPU usage rate 1013 may store a maximum value, a minimum value, or a target value of usage by the virtual CPU.

Further, the virtual CPU usage rate 1013 may store "automatically allocated." In such case, the deployment management server 101 automatically distributes to multiple virtual servers 312 the usable resources of the CPU 301 provided to the deployment execution server 102. At this time, the deployment management server 101 may distribute the usable resources of the CPU 301 equally or may distribute them according to weighting.

Information about the virtual memory includes a usage rate 1014 of the virtual memory. It should be noted that the virtual memory is provided to the virtual server 312 created to be deployed on the server 103 identified by the server ID 1000 in the pertinent record.

The virtual memory usage rate 1014 is a ratio of the resources used by the virtual memory to the resources of the memory 302 provided to the deployment execution server 102. It should be noted that instead of storing a usage rate, the virtual memory usage rate 1014 may store a maximum value, a minimum value, or a target value of usage by the virtual memory.

Further, "automatically allocated" may be stored in the virtual memory usage rate 1014. In this case, the deployment management server 101 automatically distributes to multiple virtual servers 312 the usable resources of the memory 302 provided to the deployment execution server 102. At this time, the deployment management server 101 may distribute the usable resources of the memory 302 equally or according to weighting.

FIG. 10 is a configuration diagram of the deployment execution server management table 218 stored in the deployment management server 101 according to the first embodiment of this invention.

The deployment execution server management table 218 includes a virtual server ID 1100, information about the virtual HBA, information about the virtual NIC, information about the virtual CPU, information about the virtual memory, and the deployment target server ID 1109.

The virtual server ID 1100 is a unique identifier of the virtual server 312 generated by the deployment execution server 102.

The information about the virtual HBA includes a physical WWN 1101 of the virtual HBA, a virtual WWN 1102 of the virtual HBA virtual, and shared/dedicated 1103. It should be noted that the virtual HBA is provided to the virtual server 312 identified by the virtual server ID 1100 in the pertinent record.

The physical WWN 1101 of the virtual HBA is a WWN assigned to that HBA 303 which realizes the virtual HBA, from among the HBAs 303 provided to the deployment execution server 102.

The virtual WWN 1102 of the virtual HBA is a WWN assigned to the virtual HBA. Shared/dedicated 1103 indicates whether that virtual HBA dedicates or shares the HBA 303 provided to the deployment execution server 102.

The information about the virtual NIC includes a physical MAC address 1104 of the virtual NIC, a virtual MAC address 1105 of the virtual NIC, and shared/dedicated 1106. It should be noted that the virtual NIC is provided to the virtual server 312 identified by the virtual server ID 1100 in the pertinent record.

The physical MAC address 1104 of the virtual NIC is a MAC address assigned to that NIC 304, from among the NICs 304 provided to the deployment execution server 102, which realizes the virtual NIC.

The virtual WWN 1102 of the virtual NIC is a MAC address assigned to the virtual NIC. Shared/dedicated 1103 indicates whether that virtual NIC dedicates or shares the NIC 304 provided to the deployment execution server 102.

The information about the virtual CPU includes a usage rate 1107 of the virtual CPU. It should be noted that the virtual CPU is provided to the virtual server 312 identified by the virtual server ID 1100 in that record.

The virtual CPU usage rate 1107 is a ratio of the resources which are being used by the virtual CPU to the resources of the CPU 301 provided to the deployment execution server 102.

The information about the virtual memory includes a usage rate 1108 of the virtual memory. It should be noted that the virtual memory is provided to the virtual server 312 that is identified by the virtual server ID 1100 in that record.

The virtual memory usage rate 1108 is a ratio of the resources which are used by the virtual memory to the resources of the memory 302 provided to the deployment execution server 102.

The deployment target server ID 1109 is a unique identifier of the server 103 which is targeted for deployment using the virtual server 312 identified by the virtual server ID 1100 in the same record.

FIG. 11 is a configuration diagram of the disk image management table 219 stored in the deployment management server 101 according to the first embodiment of this invention.

The disk image management table 219 contains a disk image name 1200, an original disk image LU ID 1201, an OS name 1202, OS patch information 1203, a middleware name 1204, middleware patch information 1205, an application name 1206, application patch information 1207, and a driver storage path 1208.

The disk image name 1200 is a unique identifier of the disk image deployed to the server 103 or the virtual server 312. The original disk image LU ID 1201 is a unique identifier of the LU 132 where there is stored the original of the disk image that is identified by the disk image name 1200 in the same record. In other words, the original disk image LU ID 1201 is a unique identifier of where the disk image identified by the disk image name 1200 in the record is stored.

The OS name 1202 is the name of an OS stored in the disk image LU 501 that is identified by the original disk image LU ID 1201 in the record. The OS patch 1203 is a unique identifier of a patch being applied to the OS stored in the disk image LU 501 identified by the original disk image LU ID 1201 in the record.

The middleware name 1204 is the name of middleware stored in the disk image LU 501 that is identified by the original disk image LU ID 1201 in the record. The middleware patch information 1205 is a unique identifier of a patch that is being applied to the middleware stored in the disk image LU 501 that is identified by the original disk image LU ID 1201 in the record.

The application name 1206 is the name of an application, stored in the disk image LU 501 that is identified by the original disk image LU ID 1201 in the given record. The application patch information 1207 is a unique identifier of a patch being applied to the application stored in the disk image LU 501 identified by the original disk image LU ID 1201 in the record.

The driver storage path 1208 indicates a path where drivers needed by the server 103 are stored.

FIG. 12 is a configuration diagram of the security management table 220 stored in the deployment management server 101 according to the first embodiment of this invention.

The security management table 220 contains a host group name 1300, a WWN 1301, and an LU ID 1302.

The host group name 1300 is a unique identifier of a host group. The WWN 1301 is a WWN assigned to the server 103 or the virtual server 312 belonging to the host group identified by the host group name 1300 in the same record. The LU ID 1302 is a unique identifier of the LU 132 accessible by the host group identified by the host group name 1300 in the record.

Figure 13:
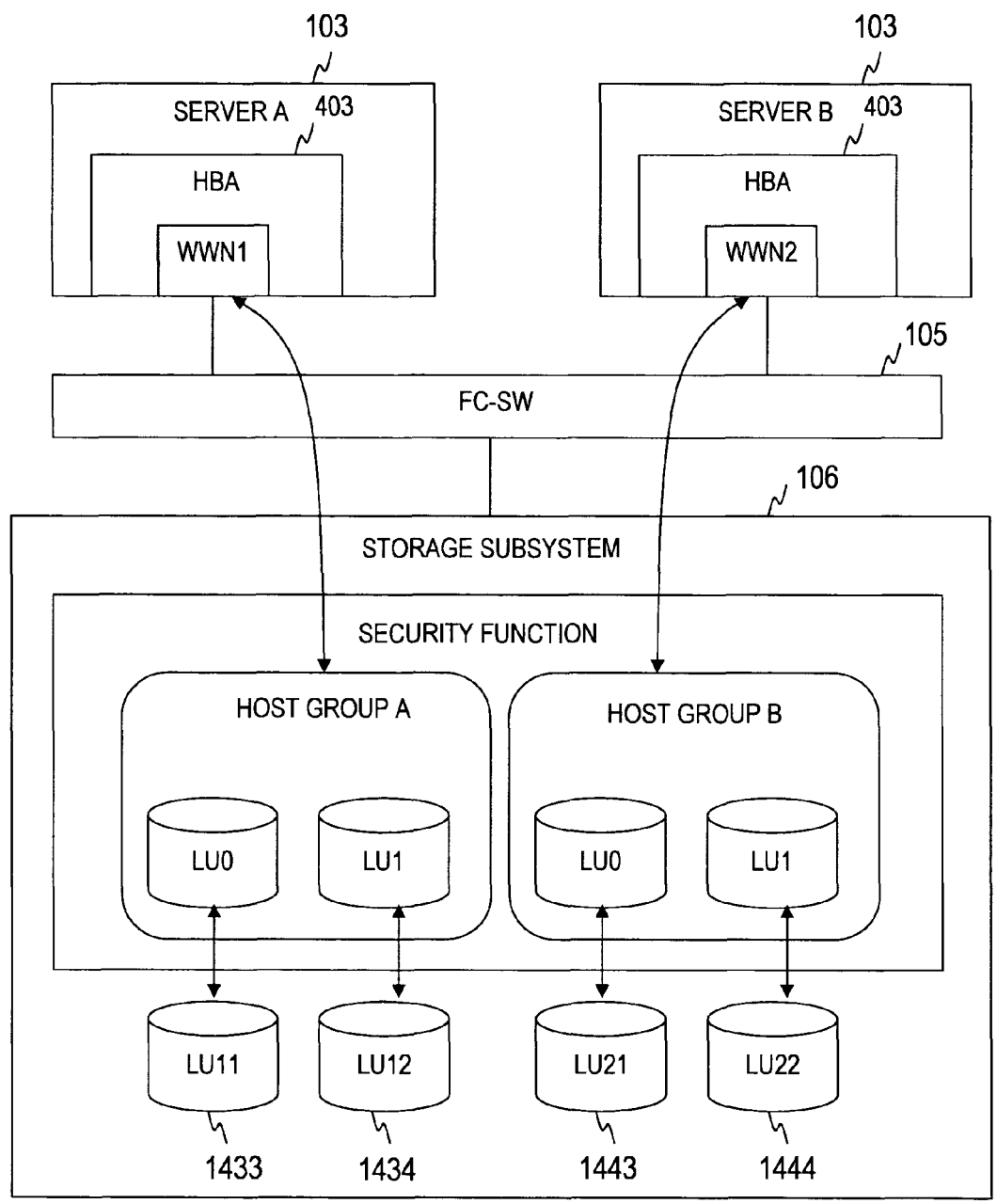
FIG. 13 is an explanatory diagram of security functions according to the first embodiment of this invention.

FIG. 13 is an explanatory diagram of security functions according to the first embodiment of this invention.

It should be noted that the present explanatory diagram explains security functions of a server A103 and a server B103.

"WWN1" is assigned to the HBA 403 provided to the server A103. The server A103 belongs to host group A.

On the other hand, "WWN2" is assigned to the HBA 403 provided to the server B103. The server B103 belongs to host group B.

The storage subsystem 106 provides security functions. To be specific, the storage subsystem 106 sets a path in response to an instruction from the storage path setting subprogram 211.

Accordingly, the server A103 belonging to the host group A can now access the LU 1433 and the LU 1434. At the time of access, the server A103 recognizes the LU ID of the LU 1433 as "LU 0", and the server A103 recognizes the LU ID of the LU 143 as "LU 1". However, the server A103 cannot access the LU 1443 and the LU 1444.

Similarly, the server B103 belonging to the host group B can now access the LU 1443 and the LU 1444. At the time of access, the server B103 recognizes the LU ID of the LU 1443 as "LU 0", and the server B103 recognizes the LU ID of the LU 1444 as "LU 1". However, the server B103 cannot access the LU 1443 and the LU 1434.

Figure 14:
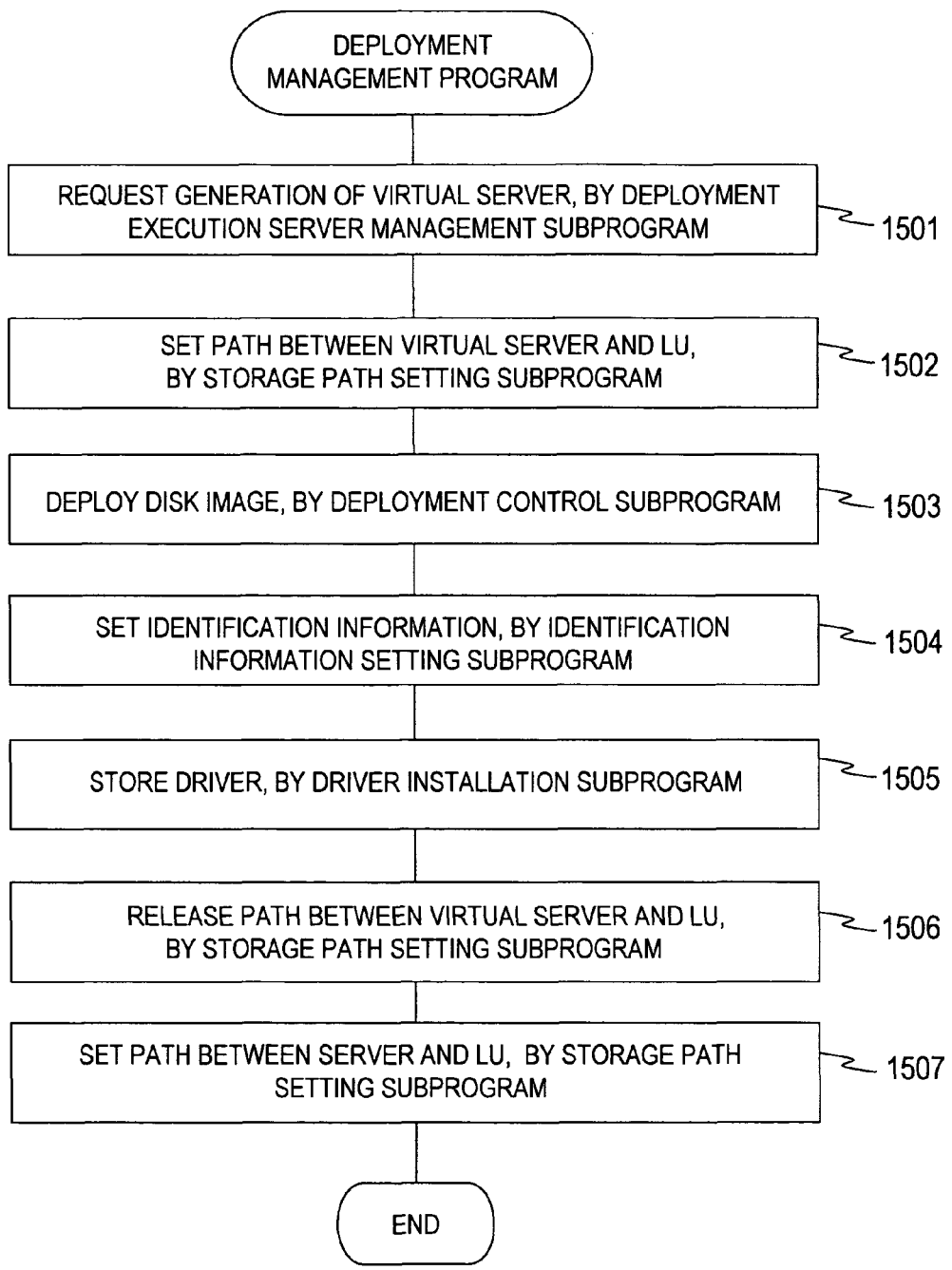
FIG. 14 is a flowchart of processing by the deployment management program stored in the deployment management server according to the first embodiment of this invention.

FIG. 14 is a flowchart of processing by the deployment management program 110 stored in the deployment management server 101 according to the first embodiment of this invention.

The deployment management program 110 starts processing when it receives a deployment request for the server 103. First, the deployment execution server management subprogram 210 of the deployment management program 110 requests the deployment execution server 102 to generate the virtual server 312 (1501). Then the deployment execution server 102 generates the virtual server 312. It should be noted that the processing of the deployment execution server management subprogram 210 is explained later in detail referring to FIG. 15.

Next, storage path setting subprogram 211 of the deployment management program 110 sets a path between the generated virtual server 312 and the LU 132 (1502). It should be noted that the processing of the storage path setting subprogram 211 is explained later in detail referring to FIG. 16.

Next, the deployment control subprogram 212 of the deployment management program 110 deploys the disk image on the generated virtual server 312 (1503). To be specific, the deployment control subprogram 212 duplicates the data in the disk image LU 501 into the LU 132 connected to the virtual server 312. It should be noted that the deployment control subprogram 212 may deploy the disk image by any method.

For example, the deployment control subprogram 212 may deploy the disk image via an IP network. Further, the deployment control subprogram 212 may deploy the disk image by copying it between storage locations. It should be noted that these deployment methods are disclosed in JP 2005-292922 A.

Next, the identification information setting subprogram 213 of the deployment management program 110 sets the identification information for the virtual server 312 on which the disk image was deployed (1504). Then the virtual server 312 stores the identification information into the LU 132 connected to that virtual server 312. It should be noted that the processing of the identification information setting subprogram 213 is explained later in detail referring to FIG. 17.

Next, the driver installation subprogram 214 of the deployment management program 110 stores the driver needed by the server 103 into an appropriate directory (1505). By doing this, the LU 132 that is connected to the virtual server 312 becomes the system disk LU 502. It should be noted that the processing of the driver installation subprogram 1505 is explained later in detail referring to FIG. 18.

Next, the storage path setting subprogram 211 of the deployment management program 110 releases the path that was set between the virtual server 312 and the system disk LU 502 (1506).

Next, the storage path setting subprogram 211 of the deployment management program 110 sets the path between the server 103 that is targeted for deployment, and the system disk LU 502 (1507).

In the foregoing manner, the single deployment management server 101 can execute deployment of multiple servers 103 in different network segments.

Figure 15:
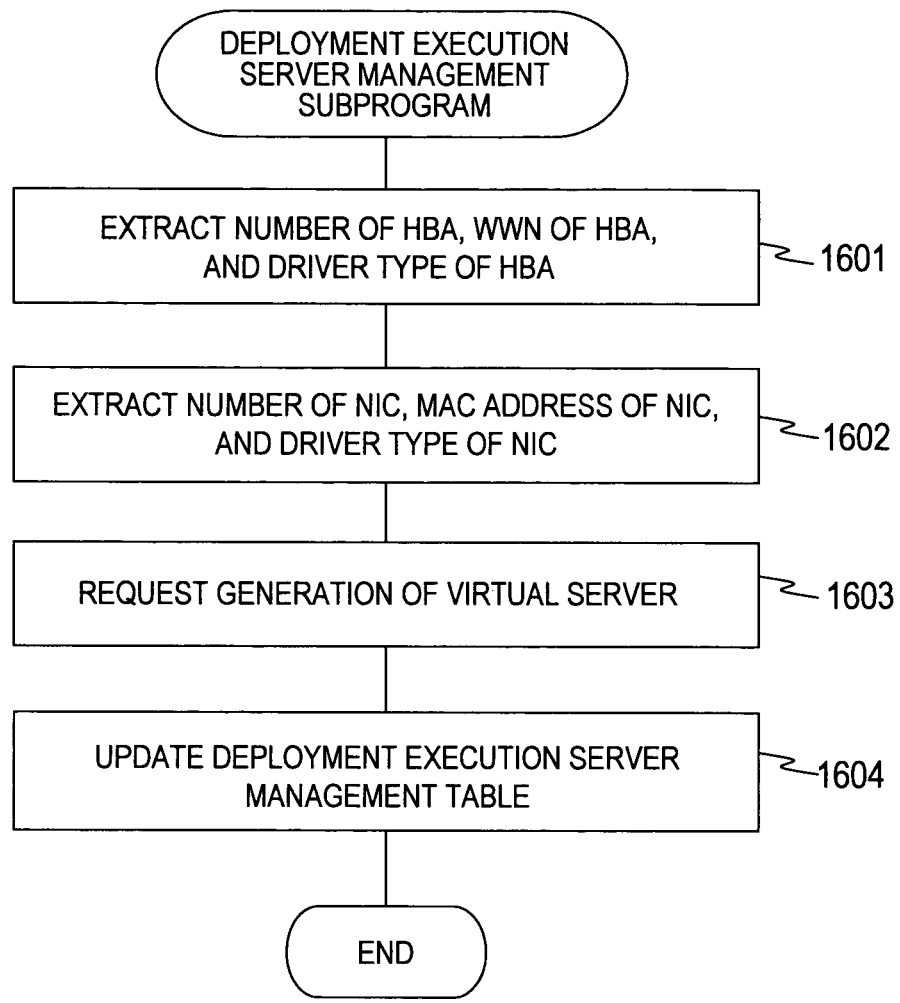
FIG. 15 is a flowchart of processing by the deployment execution server management subprogram according to the first embodiment of this invention.

FIG. 15 is a flowchart of processing by the deployment execution server management subprogram 210 according to the first embodiment of this invention.

The deployment execution server management subprogram 210 performs step 1501 in the deployment management program 110 processing as shown in FIG. 14.

First, the deployment execution server management subprogram 210 selects, from the server configuration management table 216, the record in which the identifier of the deployment target server 103 matches the server ID 900. Then the deployment execution server management subprogram 210 extracts the HBA quantity 901, the HBA WWN 902, and the HBA driver type 903 from the selected record (1601).

Next, the deployment execution server management subprogram 210 extracts the NIC quantity 904, the NIC MAC address 905, and the NIC driver type 906 from the selected record (1602).

Next, the deployment execution server management subprogram 210 sends the deployment execution server 102 a request to generate the virtual server 312 (1603). It should be noted that the request to generate the virtual server contains the extracted HBA quantity 901, HBA WWN 902, HBA driver type 903, NIC quantity 904, NIC MAC address 905, and NIC driver type 906.

Then the deployment execution server 102 generates the virtual server 312. Here, the virtual server 312 provides the same quantity of virtual HBAs as the HBA quantity 901 contained in the virtual server 312 generation request. This means that the virtual server 312 provides the same quantity of virtual HBAs as the HBAs 403 provided to the deployment target server 103. Furthermore, the HBA WWN 902 contained in the virtual server 312 generation request is assigned to the virtual HBA. This means that the virtual HBA is assigned the same WWN as the HBA 403 provided to the deployment target server 103.

Furthermore, the virtual server 312 is provided with the same quantity of virtual NICs as the NIC quantity 904 contained in the virtual server 312 generation request. This means that the virtual server 312 is provided with the same quantity of NICs 404 as are provided to the deployment target server 103. The virtual NIC is also assigned the NIC MAC address 905 contained in the virtual server 312 generation request. This means that the virtual NIC is assigned the same MAC address as the NIC 404 provided to the deployment target server 103.

On the other hand, when the deployment execution server management subprogram 210 sends the virtual server 312 generation request, it updates the deployment execution server management table 218 (1604).

To be specific, the deployment execution server management subprogram 210 updates the deployment execution server management table 218 based on the information about the generated virtual server 312. First, the deployment execution server management subprogram 210 stores the generated virtual server's identifier in the virtual server ID 1100 in the deployment execution server management table 218.

Next the deployment execution server management subprogram 210 specifies, from among the HBAs 303 provided to the deployment execution server 102, the HBA 303 which will realize the virtual HBA of the generated virtual server 312. Next, the deployment execution server management subprogram 210 specifies the WWN to be assigned to the specified HBA 303. Then the deployment execution server management table 218 stores the specified WWN into the physical WWN 1101 of the virtual HBA in the deployment execution server management table 218.

Next, the deployment execution server management subprogram 210 specifies, from among the NICs 304 provided to the deployment execution server 102, the NIC 304 which will realize the virtual NIC of the generated virtual server 312. Then the deployment execution server management subprogram 210 specifies the MAC address to be assigned to the specified NIC 304. Then the deployment execution server management subprogram 210 stores the specified MAC address into the physical MAC address 1104 of the virtual NIC in the deployment execution server management table 218.

Next, the deployment execution server management subprogram 210 stores identifier of the deployment target server 103 into the deployment target server ID 1109 in the deployment execution server management table 218.

Next, the deployment execution server management subprogram 210 selects, from the identification information management table 217, the record in which the identifier of the deployment target server 103 matches the server ID 1000. Then the deployment execution server management subprogram 210 extracts, from the selected record, the virtual HBA's virtual WWN 1009, whether the virtual HBA shared/dedicated 1010, the virtual NIC's virtual MAC address 1011, whether the virtual NIC shared/dedicated 1012, the virtual CPU usage rate 1013, and the virtual memory usage rate 1014.

Next, the deployment execution server management subprogram 210 stores the extracted virtual HBA virtual WWN 1009 into the virtual HBA virtual WWN 1101 in the deployment execution server management table 218.

However, in the case where the extracted virtual WWN of the virtual HBA is "server configuration management table", the deployment execution server management subprogram 210 references the server configuration management table 216. To be specific, the deployment execution server management subprogram 210 stores the HBA WWN 902, which was extracted from the server configuration management table 216, into the virtual HBA's virtual WWN 1102 in the deployment execution server management table 218.

Next, the deployment execution server management subprogram 210 stores whether the extracted virtual HBA shared/dedicated 1010, in the entry for shared/dedicated 1103 in the deployment execution server management table 218.

Next, the deployment execution server management subprogram 210 stores the virtual NIC's virtual MAC address 1011, which was extracted, into the entry for the virtual NIC's virtual MAC address in the deployment execution server management table 218.

However, in the case where "server configuration management table" is stored as the extracted virtual MAC address 1011 of the virtual NIC, the deployment execution server management subprogram 210 references the server configuration management table 216. To be specific, the deployment execution server management subprogram 210 stores the NIC MAC address 905, which was extracted from the server configuration management table 216, into the virtual NIC virtual MAC address 1105 in the deployment execution server management table 218.

Next, the deployment execution server management subprogram 210 stores the extracted entry as to whether the virtual NIC shared/dedicated 1012, into the entry for shared/dedicated 1106 in the deployment execution server management table 218.

Next, the deployment execution server management subprogram 210 stores the extracted virtual CPU usage rate 1013 into the virtual CPU usage rate 1107 in the deployment execution server management table 218.

Next, the deployment execution server management subprogram 210 stores the extracted virtual memory usage rate 1014 into the virtual memory usage rate 1108 in the deployment execution server management table 218.

When the deployment execution server management subprogram 210 updates the deployment execution server management table 218, as described above, the processing ends.

Figure 16:
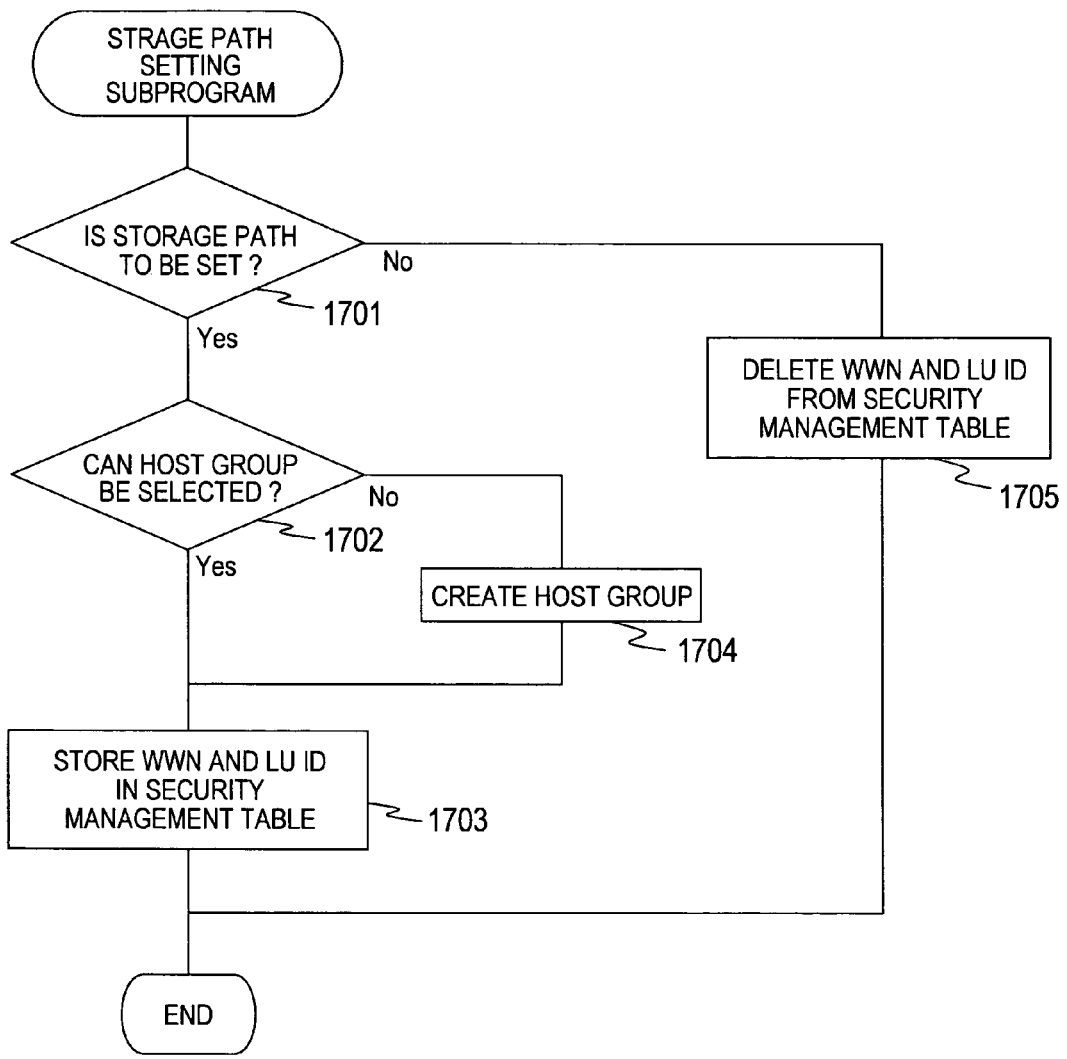
FIG. 16 is a flowchart of processing by the storage path setting subprogram according to the first embodiment of this invention.

FIG. 16 is a flowchart of processing by the storage path setting subprogram 211 according to the first embodiment of this invention.

The storage path setting subprogram 211 performs the processing at step 1502, step 1506 and step 1507, in the processes of the deployment management program 110 as shown in FIG. 14.

First, the storage path setting subprogram 211 determines whether to set or release the path (1701).

In the case where the path is to be set, the storage path setting subprogram 211 specifies the host group to which the deployment target server belongs. To be specific, the storage path setting subprogram 211 selects, from the identification information management table 217, the record in which the identifier of the deployment target server matches the server ID 1000. Then the storage path setting subprogram 211 extracts the host group name 1007 from the selected record.

Then the storage path setting subprogram 211 determines whether or not it is possible to select, from the security management table 220, a record in which the extracted host group name 1007 matches the host group name 1300 (1702).

In the case where it is possible to select from the security management table 220 a record in which the host group names match, the storage path setting subprogram 211 advances immediately to step 1703.

On the other hand, in the case where it is not possible to select from the security management table 220 a record in which the host group names match, the storage path setting subprogram 211 stores the extracted host group name 1007 into the host group name 1300 in the security management table 220. By so doing, the storage path setting subprogram 211 creates a host group to be identified by the extracted host group name 1007 (1704).

Next, the storage path setting subprogram 211 stores the WWN which is assigned to the HBA connected by the established path, into the WWN 1300 in the security management table 220. It should be noted that the HBA that is connected by the established path may be either the HBA 403 provided to the server 103, or the virtual HBA provided to the virtual server 312. Next, the storage path setting subprogram 211 stores the identifier of the LU 132 that is connected by the established path, into the LU ID 1302 in the security management table 220 (1703).

Then, the storage path setting subprogram 211 sends a path set request to the storage subsystem 106. Then the storage subsystem 106 sets the requested path. By so doing, the storage subsystem 106 provides the security function. Then, the storage path setting subprogram 211 ends the processing.

On the other hand, in the case where the path is to be released, the storage path setting subprogram 211 selects, from the security management table 220, a record in which there is a match between the WWN that is assigned to the HBA connected by the path which is to be released, and the WWN 1301. It should be noted that the HBA that is connected by the path which is to be released, may be either the HBA 403 provided to the server 103, or the virtual HBA provided to the virtual server 312. Next, the storage path setting subprogram 211 selects, from the selected record(s), a record in which there is a match between the identifier of the LU 132 that is connected by the path which is to be released, and the LU ID 1302 in the security management table 220. Then the storage path setting subprogram 211 deletes the selected record (1705).

Then, the storage path setting subprogram 211 sends a path release request to the storage subsystem 106. Then the storage subsystem 106 releases the requested path. Then the storage path setting subprogram 211 ends the processing.

Figure 17:
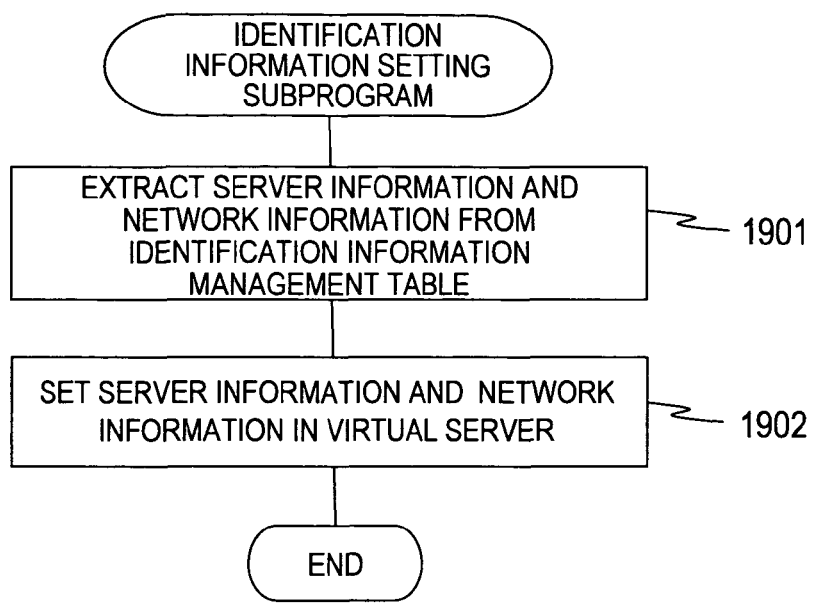
FIG. 17 is a flowchart of processing by the identification information setting subprogram according to the first embodiment of this invention.

FIG. 17 is a flowchart of processing by the identification information setting subprogram 213 according to the first embodiment of this invention.

The identification information setting subprogram 213 performs step 1504 in the deployment management program 110 processing as shown in FIG. 14.

First, the identification information setting subprogram 213 selects, from the identification information management table 217, a record in which the identifier of the deployment target server matches the server ID 1000. Then the identification information setting subprogram 213 extracts the identification information containing the server information and the network information, from the selected record (1901).

The identification information contains the host name 1001, the password 1002, the IP address 1003, the subnet mask 1004, and the default gateway 1005.

Next, the identification information setting subprogram 213 sets the extracted identification information onto the virtual server 312 that was generated by the deployment execution server 102. Then the virtual server 312 stores the set identification information, into the LU 132 connected to the pertinent virtual server 312.

Figure 18:
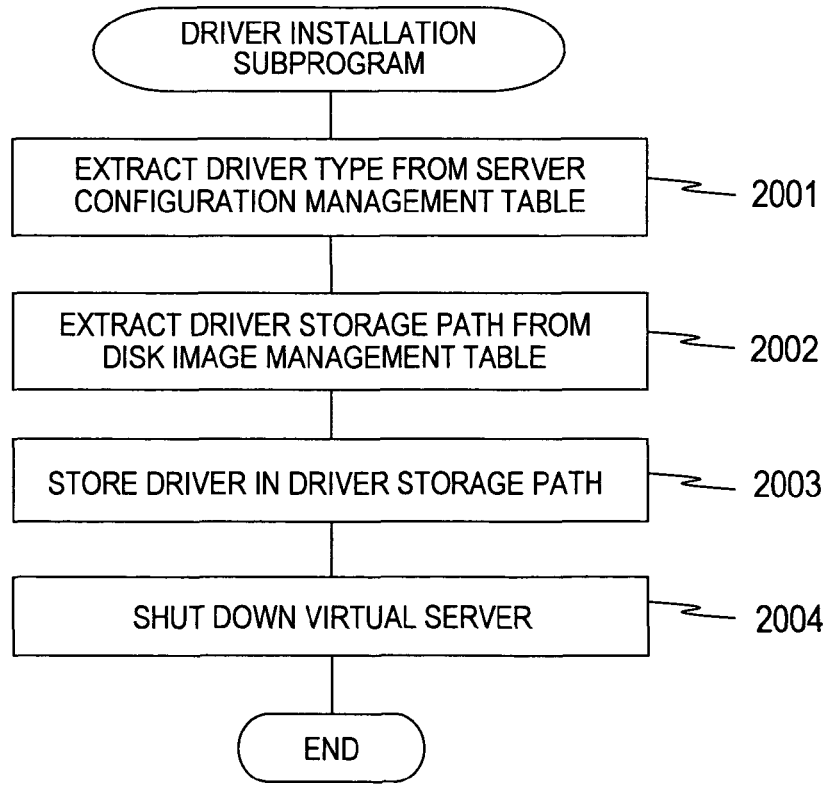
FIG. 18 is a flowchart of processing by the driver installation subprogram according to the first embodiment of this invention.

FIG. 18 is a flowchart of processing by the driver installation subprogram 214 according to the first embodiment of this invention.

The driver installation subprogram 214 performs the processing at step 1505 in the processing of the deployment management program 110 as shown in FIG. 14.

First, the driver installation subprogram 214 selects from the server configuration management table 216, the record in which the identifier of the deployment target server 103 matches the server ID 900. Then, the driver installation subprogram 214 extracts the HBA driver type 903 and the NIC driver type 906, from the selected record (2001).

Next, the driver installation subprogram 214 selects, from the disk image management table 219, the record in which there is a match between the identifier of the disk image deployed on the server, and the disk image name 1200. Then, the driver installation subprogram 214 extracts the driver storage path 1208 from the selected record (2002).

Next, the driver installation subprogram 214 stores the driver corresponding to the extracted HBA driver type 903, and the driver corresponding to the extracted NIC driver type 906, into a directory corresponding to the driver storage path 1208 which was extracted (2003).

Next, the driver installation subprogram 214 shuts down (i.e., deactivates) the virtual server 312. Then the driver installation subprogram 214 ends the processing.

In the manner described above, the driver installation subprogram 214 is able to absorb driver-level discrepancies between the server 103 and the virtual server 312.

According to this embodiment, the single deployment management server 101 can execute deployment to multiple servers at different network segments. By so doing, it becomes possible for the deployment management server 101, while in the development environment, to complete the production environment deployment. It should be noted that the development environment and the production environment denote different network segments. In other words, the deployment management server 101 completes deployment in the production environment while in the development environment, which is the previous stage, thus accelerating construction of the environment.

It should be noted that the deployment management server 101 and the deployment execution server 102 may be realized with a single computer. In such a case, the deployment management program 110 is stored in a special region that does not get deleted. Thus, the deployment management program 110 performs generation, deletion, and configuration updating of the virtual server 312.

Second Embodiment

A second embodiment of this invention involves deployment by utilizing remote copying.

Figure 19:
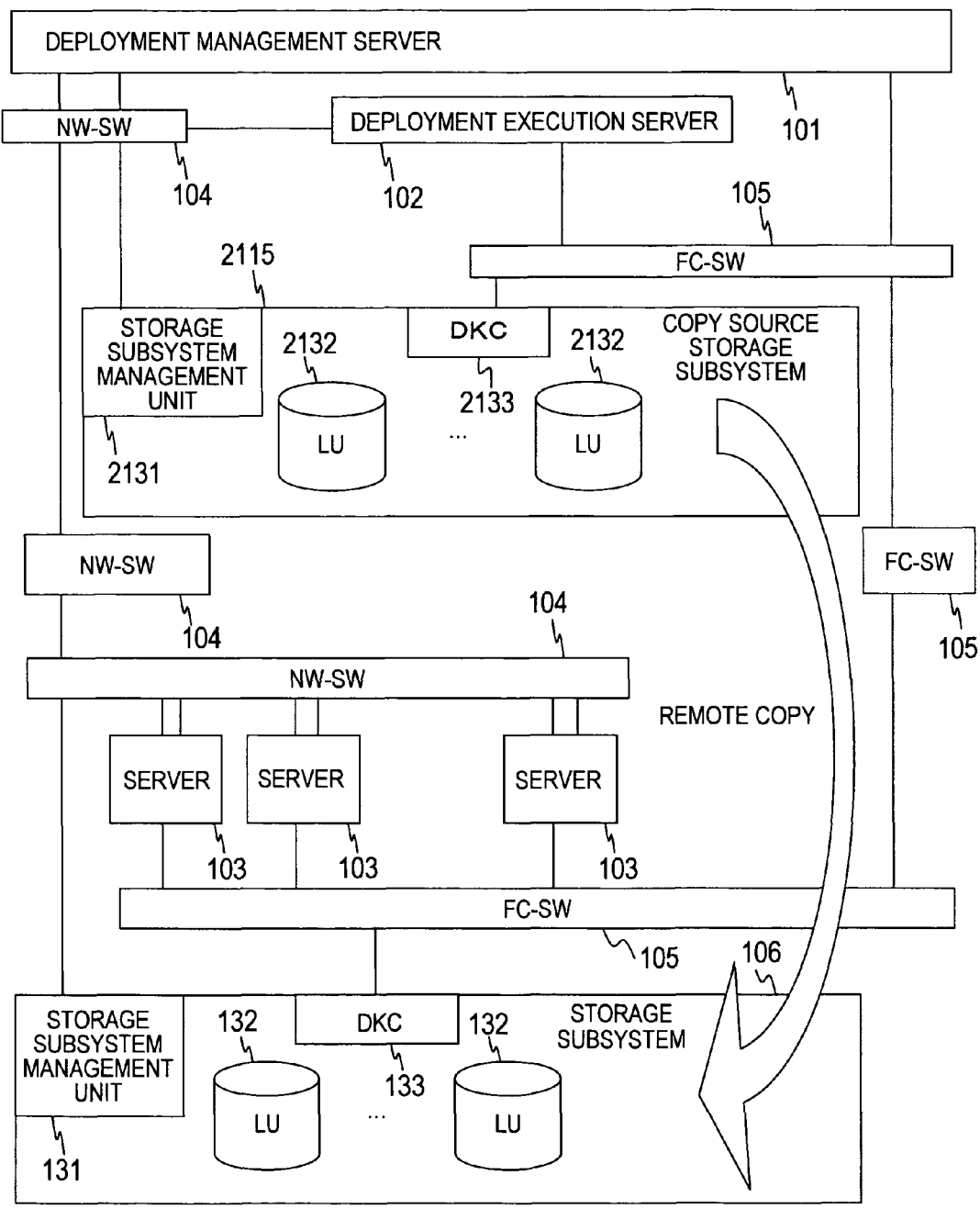
FIG. 19 is a block diagram of a computer system configuration according to the second embodiment of this invention.

FIG. 19 is a block diagram of a computer system configuration according to the second embodiment of this invention.

The computer system according to the second embodiment is provided with the deployment management server 101, the deployment execution server 102, the server 103, the storage subsystem 106, a copy source storage subsystem 2115, the network switch (NW-SW) 104, and the fibre channel switch (FC-SW) 105. The deployment execution server 102, the server 103, the storage subsystem 106, the network switch 104, and the fibre channel switch 105 are identical to those provided to the computer system according to the first embodiment as shown in FIG. 1, so their explanations are omitted. It should be noted that the deployment management server 101 is explained later in detail referring to FIG. 20.

In the computer system according to the second embodiment, the server 103 is connected to the storage subsystem 106 via a SAN. On the other hand, the deployment execution server 102 is connected to the copy source storage subsystem 2115 via the SAN.

The copy source storage subsystem 2115 is provided with a storage subsystem management unit 2131, a disk controller (DKC) 2133, and a physical disk.

The physical disk stores various types of data. The disk controller 2133 is connected to the deployment management server 101 and the deployment execution server 102, via the fibre channel switch 105. Furthermore, the disk controller 2113 controls the writing of data to the physical disk, and the reading of data from the physical disk. The disk controller 2113 also provides the storage areas on the physical disk to the deployment management server 101 and the deployment execution server 102, as one or more logical volumes (LU) 2132.

Furthermore, the disk controller 2113 remotely copies the information stored in the LU 2132, to the LU 132 in the storage subsystem 106.

The storage subsystem management unit 2131 is connected to the deployment management server 101, etc. via the network switch 104. The storage subsystem management unit 2131 receives an instruction from the deployment management server 101, and performs processing according to the received instruction.

Figure 20:
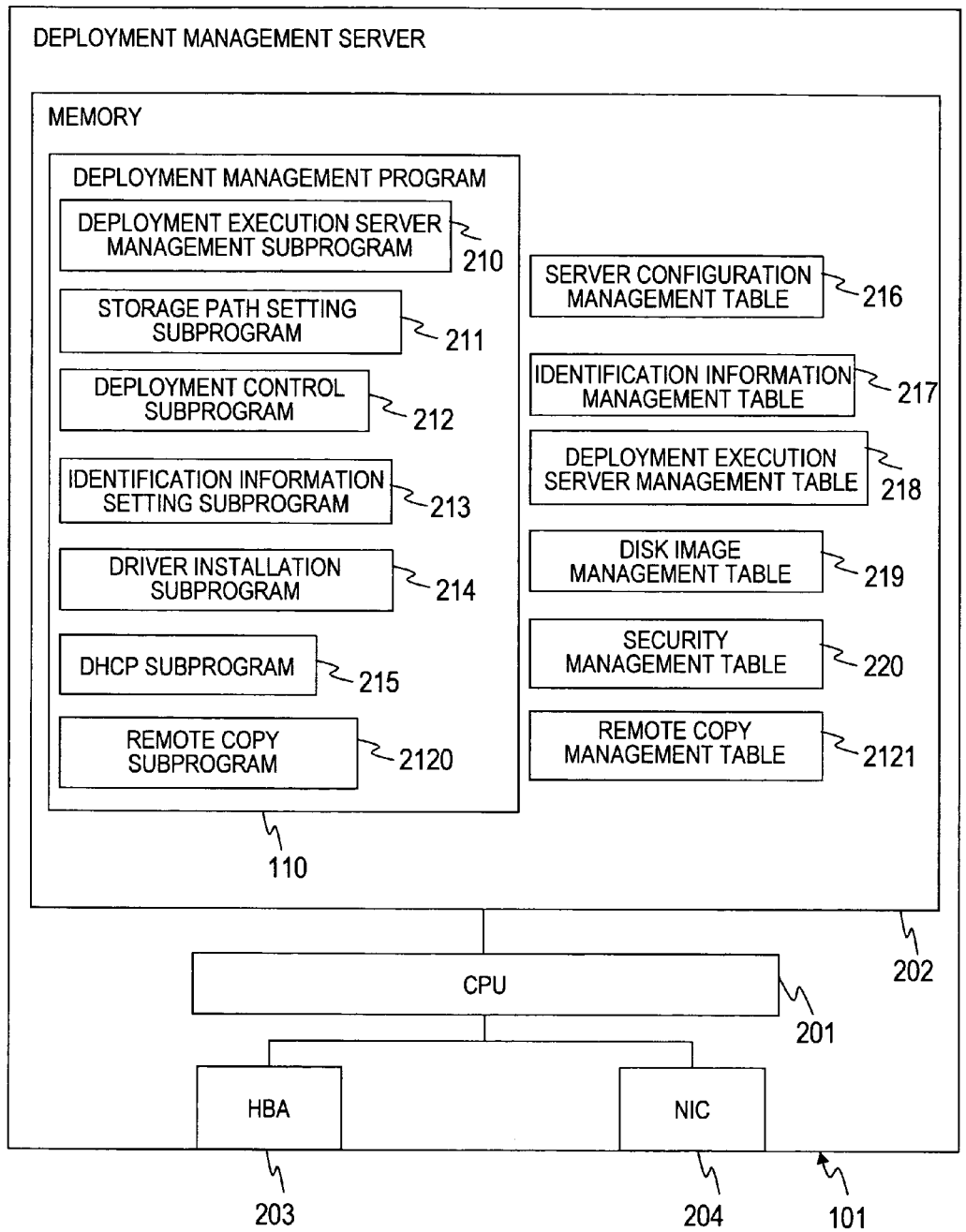
FIG. 20 is a block diagram of a configuration of the deployment management server according to the second embodiment of this invention.

FIG. 20 is a block diagram of a configuration of the deployment management server 101 according to the second embodiment of this invention.

Except for the information stored in the memory 202, the deployment management server 101 in the second embodiment is identical to the deployment management server 101 as shown in FIG. 2 of the first embodiment. Similar constructions are assigned similar reference numerals, and their explanations are omitted.

The memory 202 stores the deployment management program 110, the server configuration management table 216, the identification information management table 217, the deployment execution server management table 218, the disk image management table 219, the security management table 220, and a remote copy management table 2121. The server configuration management table 216, the identification information management table 217, the deployment execution server management table 218, the disk image management table table 219 and the security management table 220 are identical to those stored in the deployment management server as shown in FIG. 2 of the first embodiment, so their explanations are omitted.

The deployment management program 110 is identical to the one stored in the deployment management server 101 as shown in FIG. 2 in the first embodiment, except for the fact that it includes a remote copying subprogram 2120.

The remote copying subprogram 2120 remotely copies the data stored in the LU 2132 provided by the copy source storage subsystem 2115, into the LU 132 provided by the storage subsystem 106. It should be noted that the remote copying subprogram 2120 references the remote copy management table 2121 to perform the remote copying.

The remote copy management table 2121 manages the correspondence between the LU 2132 serving as the remote copy source and the LU 132 serving as the remote copy destination. It should be noted that the remote copy management table 2121 is explained later in detail referring to FIG. 21.

Figure 21:
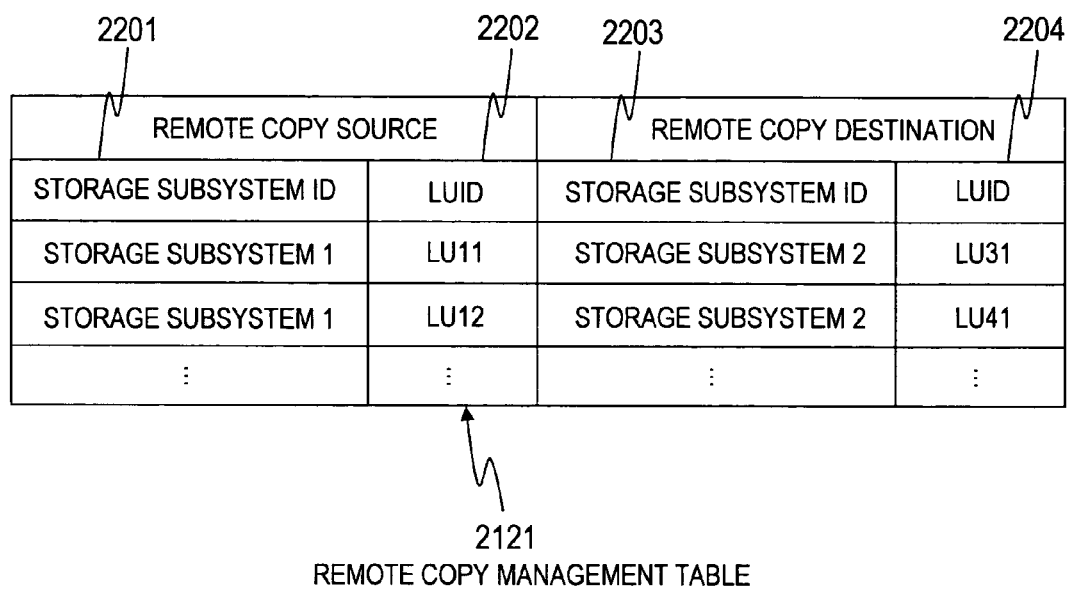
FIG. 21 is a configuration diagram of the remote copy management table, which is stored in the deployment management server in the second embodiment of this invention.

FIG. 21 is a configuration diagram of the remote copy management table 2121, which is stored in the deployment management server 101 in the second embodiment of this invention.

The remote copy management table 2121 contains a remote copy source storage subsystem ID 2201, the remote copy source LU ID 2202, the remote copy destination storage subsystem ID 2203, and the remote copy destination storage subsystem ID 2204.

The remote copy source storage subsystem ID 2201 is a unique identifier of the copy source storage subsystem 2115 serving as the remote copy source. The remote copy source LU ID 2202 is a unique identifier of the LU 2132 serving as the remote copy source.

The remote copy destination storage subsystem ID 2203 is a unique identifier of the storage subsystem 106 serving as the remote copy destination. The LU ID 2204 of the remote copy destination is a unique identifier of the LU 132 that serves as the remote copy destination.

Figure 22:
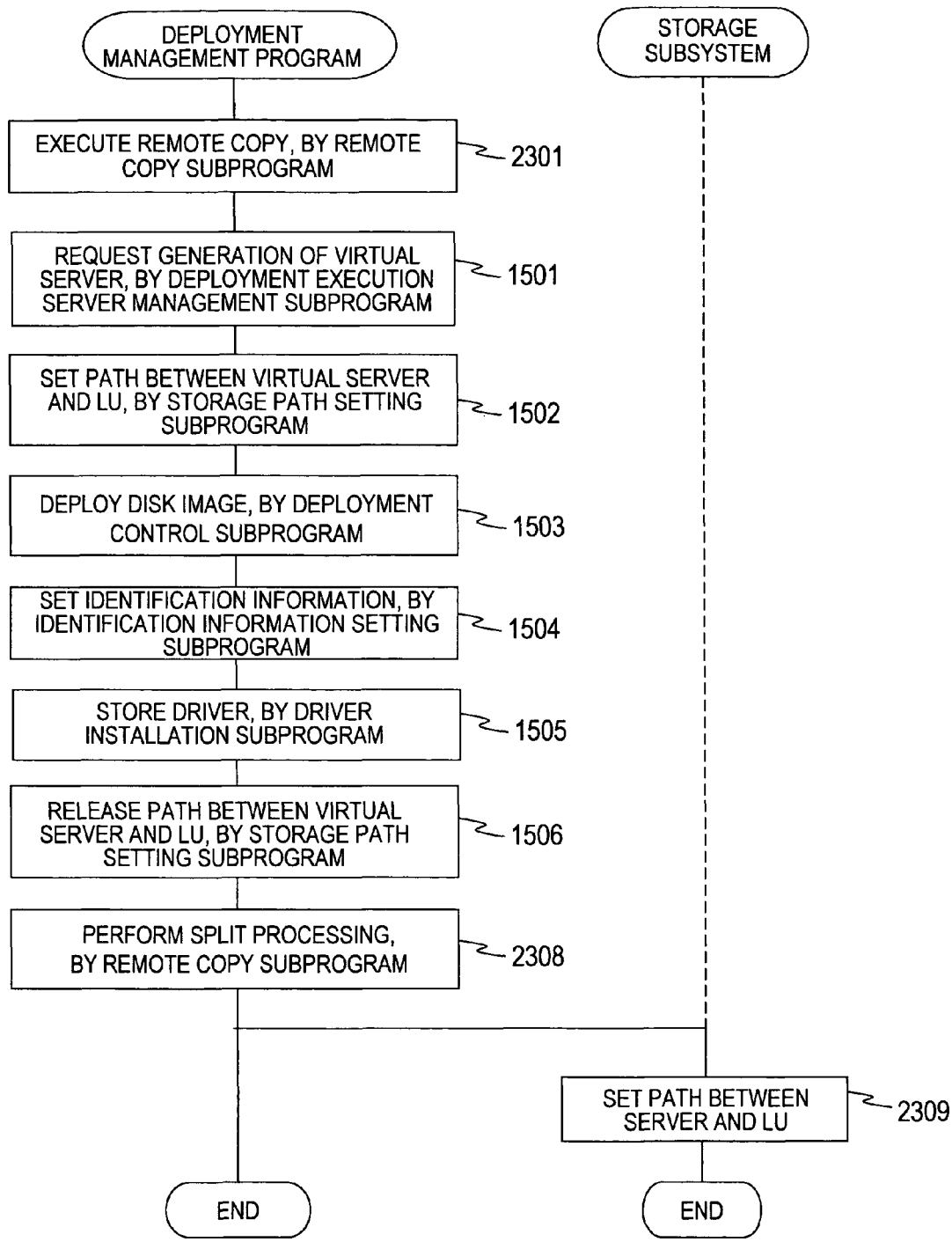
FIG. 22 is a flowchart of processing by the deployment management program, which is stored in the deployment management server in the second embodiment of this invention.

FIG. 22 is a flowchart of processing by the deployment management program 110, which is stored in the deployment management server 101 in the second embodiment of this invention.

The deployment management program 110 starts the processing when it receives the request to deploy to the server 103. First, the remote copying subprogram 2120 of the deployment management program 110 extracts the remote copy source storage subsystem ID 2201, the remote copy source LU ID 2202, the remote copy destination storage subsystem ID 2203, and the remote copy destination storage subsystem ID 2204, from the remote copy management table 2121.

Next, the remote copying subprogram 2120 executes the remote copy based on the extracted information (2301). To be specific, the remote copying subprogram 2120 requests the copy source storage subsystem 2115 and the storage subsystem 106 to execute the remote copying. Then the copy source storage subsystem 2115 remotely copies the data stored in the LU 2132 that is provided by that copy source storage subsystem 2115, into the LU 132 that is provided by the storage subsystem 106.

Next, the deployment management program 110 executes steps 1501 to 1506. It should be noted that steps 1501 to 1506 are identical to the steps included in the deployment management program 110 processing as shown in FIG. 14 in the first embodiment. Similar steps are assigned similar reference numerals, and so their explanations are omitted.

Next, the remote copying subprogram 2120 of the deployment management program 110 splits the LU 2132 that is provided by the copy source storage subsystem 2115, and the LU 132 that is provided by the storage subsystem 106 (2308).

Next, the storage path setting subprogram 211 of the deployment management program 110 sets a path between the deployment target server 103 and the LU 132 provided by the storage subsystem 106. (2309)

As described above, the single deployment management server 101 can execute deployment on multiple servers 103 in different network segments. To be more specific, the deployment management server 101 of this embodiment creates the system disk LU at the remote location of the server 103 to which deployment is targeted. Then, the deployment management server 101 remotely copies the created system disk LU, to execute the deployment on the server 103.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
at least one storage system;
a plurality of host computers, each included in different network segments, respectively, and including a processor, memory and an input/output (I/O) device;
a management computer which can access the storage system and the host computers, the management computer including a processor, a memory, an I/O device and configuration management information for managing the I/O device included in the host computers; and
an execution computer belonging to a same network segment as the management computer, and including a processor, a memory and an I/O device, and configured to provide a virtual computer which can access the storage system;
the storage system including a physical disk for storing data and a disk controller for controlling the physical disk, and configured to provide a storage area of the physical disk as at least one logical volume, wherein:
the management computer is configured to extract, responsive to an inputted deployment request, a configuration of the I/O device of an existing host computer of the host computers which is a deployment target, based on the configuration management information;
the management computer is configured to send a request to the execution computer to create an imitating virtual computer having a configuration which imitates a configuration of the existing host computer which is the deployment target, the request including the extracted configuration of the I/O device of the existing host computer which is the deployment target;
the execution computer is configured to create the imitating virtual computer having an I/O device which matches the I/O device of the existing host computer which is the deployment target, responsive to a received request from the management computer to generate the imitating virtual computer;
the management computer is configured to define a first connection authorizing access between a first logical volume provided by the storage system and the created said imitating virtual computer;
the management computer is configured to deploy on the imitating virtual computer, a disk image including information on a driver storage path that stores a driver needed by the existing host computer which is the deployment target, to duplicate the disk image into the first logical volume connected to the imitating virtual computer;

the management computer is configured to set identification information including an identifier of the existing host computer which is the deployment target, in the imitating virtual computer on which the disk image is deployed, to store the identification information in the first logical volume connected to the imitating virtual computer;

the management computer is configured to extract, from the configuration management information, a driver type corresponding to the I/O device of the existing host computer which is the deployment target;

the management computer is configured to store the driver corresponding to the extracted driver type in the driver storage path of the disk image duplicated into the first logical volume;

the management computer is configured to then deactivate the imitating virtual computer;

the management computer is configured to then release the first connection authorizing access between the first logical volume and the imitating virtual computer; and the management computer is configured to then define a second connection authorizing access between the existing host computer which is the deployment target and the first logical volume, whereby a program stored in the logical volume is deployed on the existing host computer which is the deployment target;

wherein each host computer is authorized to access one or more logical volume provided only in a same network segment as said each host computer, and wherein the management computer defining the second connection authorizing access between the existing host computer which is the deployment target and the first logical volume, effects the first logical volume into the same network segment as said existing host computer.

2. The computer system according to claim 1, wherein the management computer is configured to set an identifier of the I/O devices of the imitating virtual computer, to be the same as an identifier of I/O devices of the existing host computer.

3. The computer system according to claim 2, wherein:
the I/O devices includes one of a network interface card and a host bus adapter; and
the identifier of the I/O devices includes one of a MAC address of the network interface card and a World Wide Name of the host bus adapter, respectively.

4. The computer system according to claim 1, wherein:
the at least one storage system includes a first storage system and a second storage system;
in a case where a connection authorizing access between the existing host computer and a second logical volume is not set,
the first storage system provides the imitating virtual computer with the second logical volume;
the second storage system provides the existing host computer with a third logical volume;
the management computer copies data of the second logical volume that stores the identification information to the third logical volume;
the management computer releases the connection authorizing access between the second logical volume that stores the identification information and the imitating virtual computer; and
the management computer defines a connection authorizing access between the third logical volume and the existing host computer.

5. The computer system according to claim 1, wherein the first logical volume stores a disk image deployed on the existing host computer.

6. The computer system according to claim 5, wherein the disk image stored in the first logical volume includes at least one of an operating system, a middleware and an application program.

7. The computer system according to claim 1, wherein the existing host computer is a virtual computer created by a virtualization program executed by the execution computer.

8. The computer system according to claim 1, wherein the management computer and the execution computer, are implemented in a physical computer.

9. A non-transitory, computer-readable program product having computer code executed by components of a computer system, including:
at least one storage system;
a plurality of host computers, each included in different network segments, respectively, and including a processor, memory and an input/output (I/O) device;
a management computer which can access the storage system and the host computers, the management computer including a processor, a memory, an I/O device and configuration management information for managing the I/O device included in the host computers; and
an execution computer belonging to a same network segment as the management computer, and including a processor, a memory and an I/O device, and configured to provide a virtual computer which can access the storage system;
the storage system including a physical disk for storing data and a disk controller for controlling the physical disk, and configured to provide a storage area of the physical disk as at least one logical volume;
the program product, when implemented, effecting operations comprising:
extracting, responsive to an inputted deployment request, a configuration of the I/O device of an existing host computer of the host computers which is a deployment target, based on the configuration management information;
sending a request to the execution computer to create an imitating virtual computer having a configuration which imitates a configuration of the existing host computer which is the deployment target, the request including the extracted configuration of the I/O device of the existing host computer which is the deployment target;
the execution computer creating the imitating virtual computer having an I/O device which matches the I/O device of the existing host computer which is the deployment target, responsive to a received request to generate the imitating virtual computer;
the management computer defining a first connection authorizing access between a first logical volume provided by the storage system and the created said imitating virtual computer;
the management computer deploying on the imitating virtual computer, a disk image including information on a driver storage path that stores a driver needed by the existing host computer which is the deployment target, to duplicate the disk image into the first logical volume connected to the imitating virtual computer;
the management computer setting identification information including an identifier of the existing host computer which is the deployment target, in the imitating virtual computer on which the disk image is deployed, to store the identification information in the first logical volume connected to the imitating virtual computer;

the management computer extracting, from the configuration management information, a driver type corresponding to the I/O device of the existing host computer which is the deployment target;

the management computer storing the driver corresponding to the extracted driver type in the driver storage path of the disk image duplicated into the first logical volume;

the management computer then deactivating the imitating virtual computer;

the management computer then releasing the first connection authorizing access between the first logical volume and the imitating virtual computer; and the management computer then defining a second connection authorizing access between the existing host computer which is the deployment target and the first logical volume, whereby a program stored in the logical volume is deployed on the existing host computer which is the deployment target;

wherein each host computer is authorized to access one or more logical volume provided only in a same network segment as said each host computer, and wherein the management computer defining the second connection authorizing access between the existing host computer which is the deployment target and the first logical volume, effects the first logical volume into the same network segment as said existing host computer.

10. A deployment method executed via components of a computer system, including:

at least one storage system;

a plurality of host computers, each included in different network segments, respectively, and including a processor, memory and an input/output (I/O) device;

a management computer which can access the storage system and the host computers, the management computer including a processor, a memory, an I/O device and configuration management information for managing the I/O device included in the host computers; and an execution computer belonging to a same network segment as the management computer, and including a processor, a memory and an I/O device, and configured to provide a virtual computer which can access the storage system;

the storage system including a physical disk for storing data and a disk controller for controlling the physical disk, and configured to provide a storage area of the physical disk as at least one logical volume;

the deployment method effecting operations comprising:

extracting, responsive to an inputted deployment request, a configuration of the I/O device of an existing host computer of the host computers which is a deployment target, based on the configuration management information;

sending a request to the execution computer to create an imitating virtual computer having a configuration which imitates a configuration of the existing host computer which is the deployment target, the request including the extracted configuration of the I/O device of the existing host computer which is the deployment target;

the execution computer creating the imitating virtual computer having an I/O device which matches the I/O device of the existing host computer which is the deployment target, responsive to a received request to generate the imitating virtual computer;

the management computer defining a first connection authorizing access between a first logical volume provided by the storage system and the created said imitating virtual computer;

the management computer deploying on the imitating virtual computer, a disk image including information on a driver storage path that stores a driver needed by the existing host computer which is the deployment target, to duplicate the disk image into the first logical volume connected to the imitating virtual computer;

the management computer setting identification information including an identifier of the existing host computer which is the deployment target, in the imitating virtual computer on which the disk image is deployed, to store the identification information in the first logical volume connected to the imitating virtual computer;

the management computer extracting, from the configuration management information, a driver type corresponding to the I/O device of the existing host computer which is the deployment target;

the management computer storing the driver corresponding to the extracted driver type in the driver storage path of the disk image duplicated into the first logical volume;

the management computer then deactivating the imitating virtual computer;

the management computer then releasing the first connection authorizing access between the first logical volume and the imitating virtual computer; and the management computer then defining a second connection authorizing access between the existing host computer which is the deployment target and the first logical volume, whereby a program stored in the logical volume is deployed on the existing host computer which is the deployment target;

wherein each host computer is authorized to access one or more logical volume provided only in a same network segment as said each host computer, and wherein the management computer defining the second connection authorizing access between the existing host computer which is the deployment target and the first logical volume, effects the first logical volume into the same network segment as said existing host computer.

* * * * *